United States Patent
Hirohata et al.

(10) Patent No.: US 10,088,994 B2
(45) Date of Patent: Oct. 2, 2018

(54) IMAGE DISPLAY APPARATUS WHICH DISPLAYS AN N-UP IMAGE GENERATED FROM A PLURALITY OF THUMBNAIL IMAGES BY A TOUCH OPERATION OF A DISPLAY SCREEN

(71) Applicant: Sharp Kabushiki Kaisha, Osaka-shi, Osaka (JP)

(72) Inventors: Hitoshi Hirohata, Osaka (JP); Kazuhisa Kubota, Osaka (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 295 days.

(21) Appl. No.: 15/183,547

(22) Filed: Jun. 15, 2016

(65) Prior Publication Data

US 2016/0291853 A1  Oct. 6, 2016

Related U.S. Application Data

(63) Continuation of application No. 13/076,077, filed on Mar. 30, 2011, now Pat. No. 9,398,179.

(30) Foreign Application Priority Data

Mar. 31, 2010 (JP) ................. 2010-082628

(51) Int. Cl.
*G06F 3/0484* (2013.01)
*H04N 1/00* (2006.01)
(Continued)

(52) U.S. Cl.
CPC ........ *G06F 3/04845* (2013.01); *G06F 3/0482* (2013.01); *G06F 3/0484* (2013.01);
(Continued)

(58) Field of Classification Search
CPC ............ G06F 3/04845; G06F 3/04847; G06F 3/0482; G06F 3/04883; H04N 1/0035;
(Continued)

(56) References Cited

U.S. PATENT DOCUMENTS

| | | |
|---|---|---|
| 4,890,098 A | 12/1989 | Dawes et al. |
| 5,870,091 A | 2/1999 | Lazarony et al. |

(Continued)

FOREIGN PATENT DOCUMENTS

| | | |
|---|---|---|
| CN | 101154081 A | 4/2008 |
| CN | 101617287 A | 12/2009 |

(Continued)

OTHER PUBLICATIONS

1st Final Office Action issued in copending U.S. Appl. No. 13/076,077, dated Aug. 16, 2013.

(Continued)

*Primary Examiner* — Alvin Tan
(74) *Attorney, Agent, or Firm* — Birch, Stewart, Kolasch & Birch, LLP

(57) ABSTRACT

When displaying a N-up image view in which a plurality of thumbnail images displayed in given windows are grouped and displayed in a single window by using a detecting section for detecting a contact position on a display screen of a display section, position specifications for the N-up image view of thumbnail images in the windows are received based on a contact position in the window in selecting thumbnail images to be displayed in the N-up image view by making contact with the thumbnail images, and the thumbnails images are displayed in the N-up image view based on the received position specifications.

4 Claims, 16 Drawing Sheets

(51) Int. Cl.
*G06F 3/0482* (2013.01)
*G06F 3/0488* (2013.01)

(52) U.S. Cl.
CPC ....... *G06F 3/04883* (2013.01); *H04N 1/0035* (2013.01); *H04N 1/00411* (2013.01); *H04N 1/00442* (2013.01); *H04N 1/00445* (2013.01); *H04N 1/00456* (2013.01); *H04N 2201/0094* (2013.01)

(58) Field of Classification Search
CPC ........... H04N 1/00442; H04N 1/00456; H04N 1/00411; H04N 1/00445
See application file for complete search history.

(56) References Cited

U.S. PATENT DOCUMENTS

| | | |
|---|---|---|
| 6,549,681 B1 | 4/2003 | Takiguchi et al. |
| 6,771,292 B2 | 8/2004 | Sharp |
| 7,573,486 B2 | 8/2009 | Mondry et al. |
| 7,681,120 B2 | 3/2010 | Kikuchi |
| 7,949,954 B1 | 5/2011 | Jezek, Jr. |
| 8,365,092 B2 | 1/2013 | Lanahan et al. |
| 8,392,849 B2 | 3/2013 | Jung |
| 2004/0095397 A1 | 5/2004 | Nojima et al. |
| 2007/0192730 A1 | 8/2007 | Simila et al. |
| 2008/0218816 A1 | 9/2008 | Sakuramata et al. |
| 2010/0070898 A1 | 3/2010 | Langlois et al. |
| 2010/0081475 A1 | 4/2010 | Chiang et al. |

FOREIGN PATENT DOCUMENTS

| | | |
|---|---|---|
| JP | 2004-282439 A | 10/2004 |
| JP | 2007-306236 A | 11/2007 |
| JP | 2008-227584 A | 9/2008 |

OTHER PUBLICATIONS

1st Non-Final Office Action issued in copending U.S. Appl. No. 13/076,077, dated Feb. 4, 2013.
2nd Final Office Action issued in the copending U.S. Appl. No. 13/076,077, dated Apr. 13, 2015.
2nd Non-Final Office Action issued in copending U.S. Appl. No. 13/076,077, dated Dec. 26, 2014.
Notice of Allowance issued in the copending U.S. Appl. No. 13/076,077, dated Mar. 16, 2016.

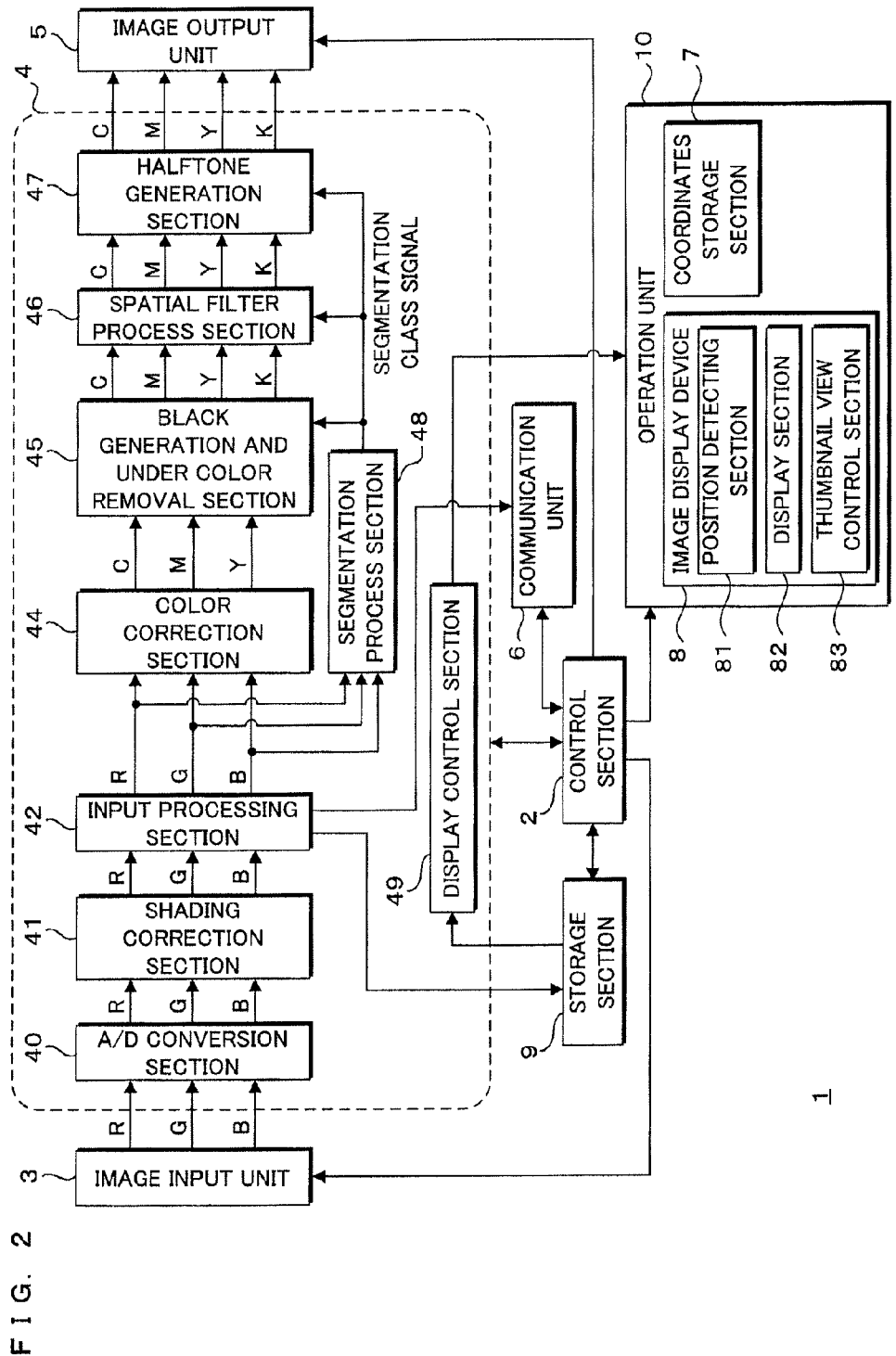
F I G. 2

FIG. 5A1 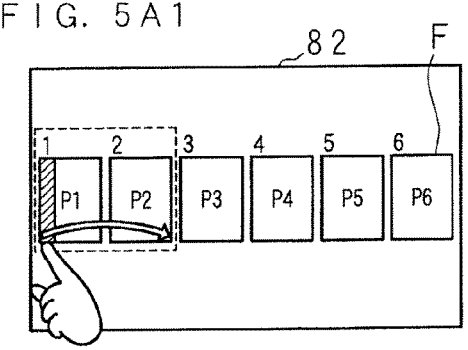
FIG. 5A2 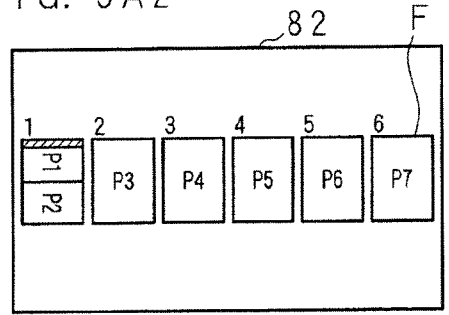
FIG. 5B1 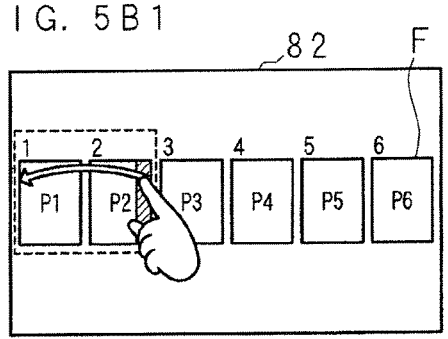
FIG. 5B2 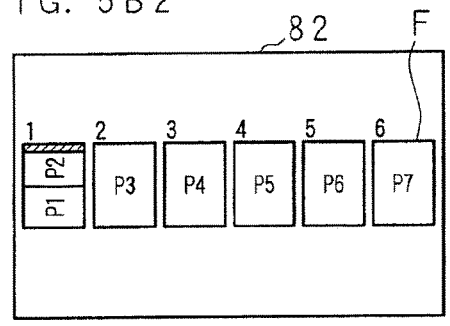
FIG. 5C1 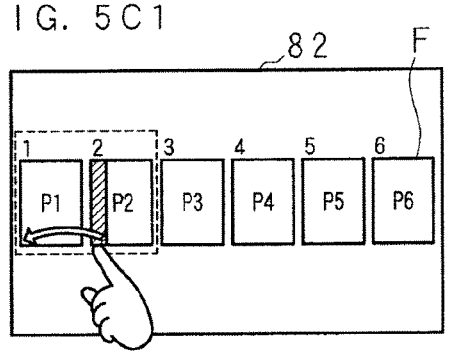
FIG. 5C2 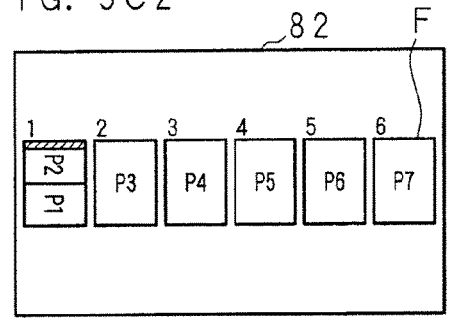
FIG. 5D1 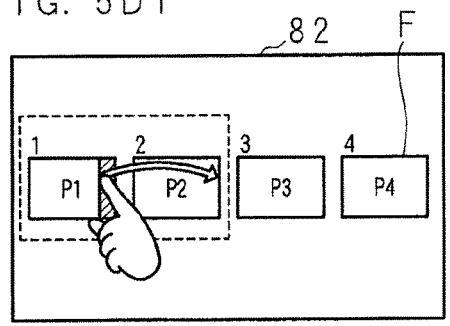
FIG. 5D2 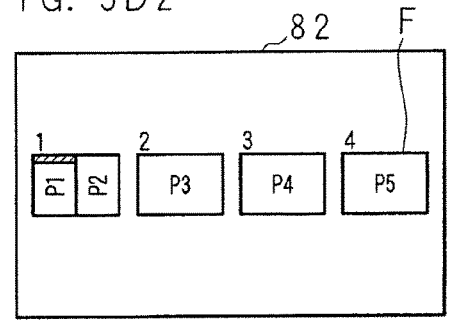

FIG. 6A1
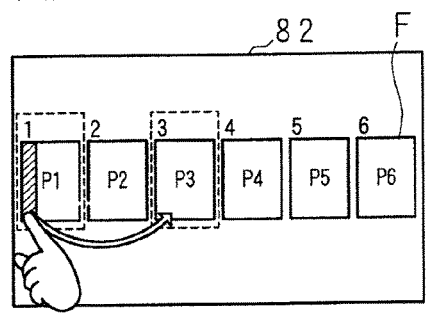
FIG. 6A2
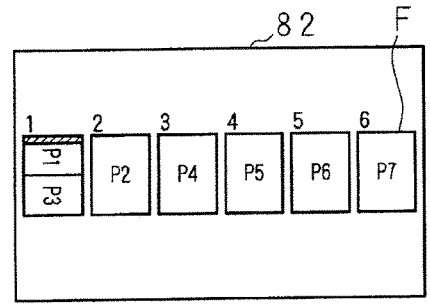
FIG. 6B1
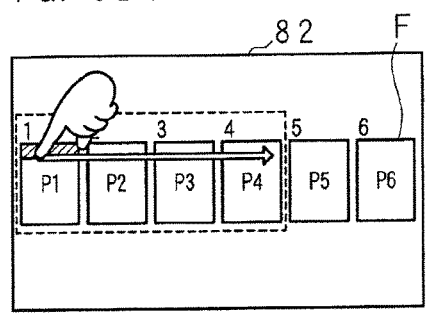
FIG. 6B2
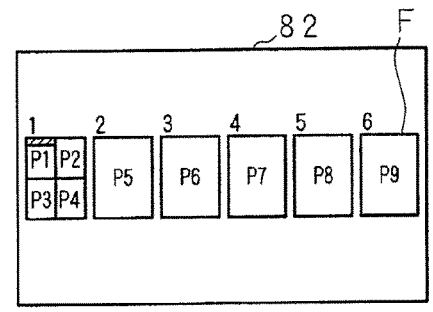
FIG. 6C1
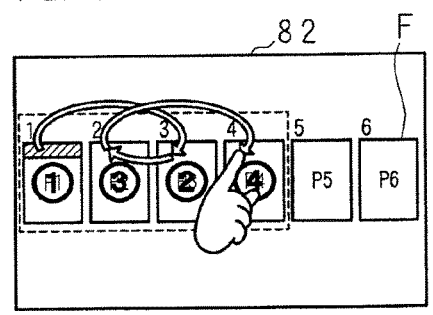
FIG. 6C2
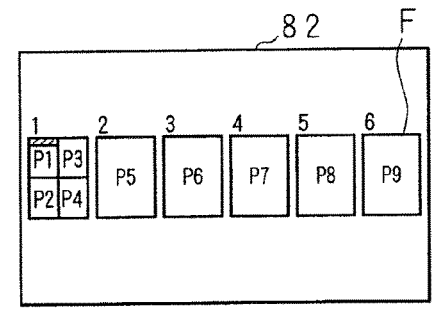

FIG. 7A1
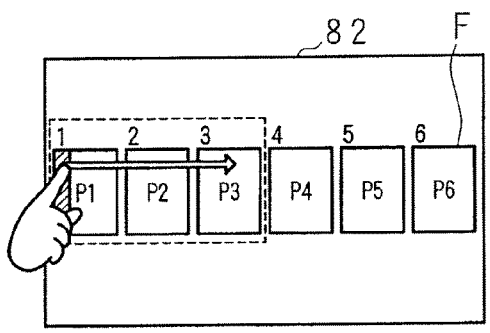
FIG. 7A2
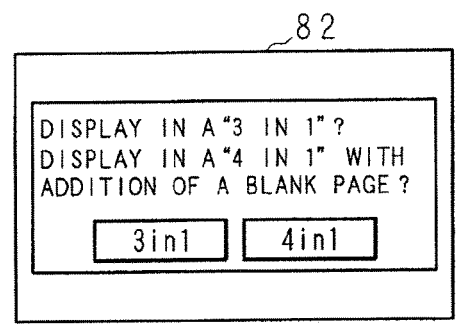
FIG. 7B
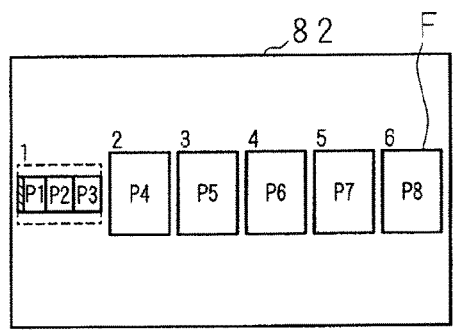
FIG. 7C
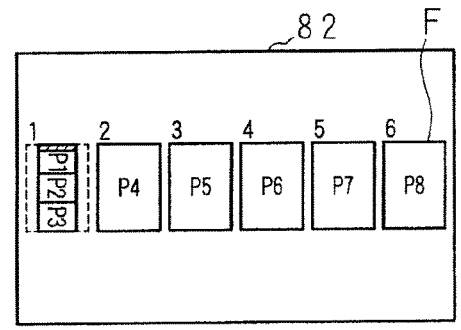
FIG. 7D
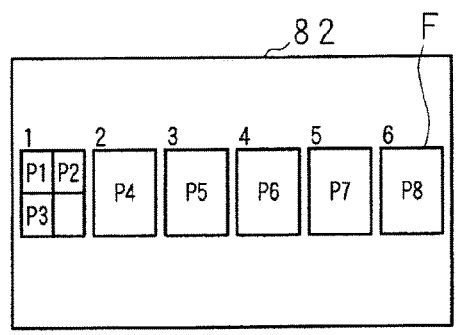

FIG. 8A1
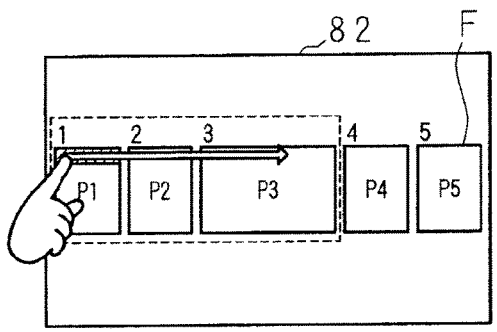
FIG. 8A2
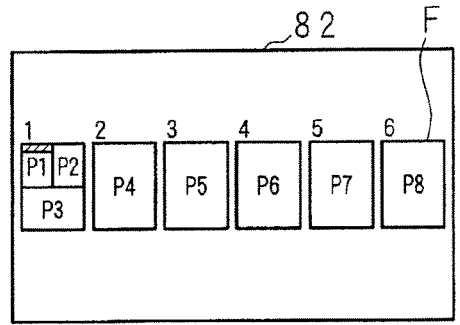
FIG. 8B1
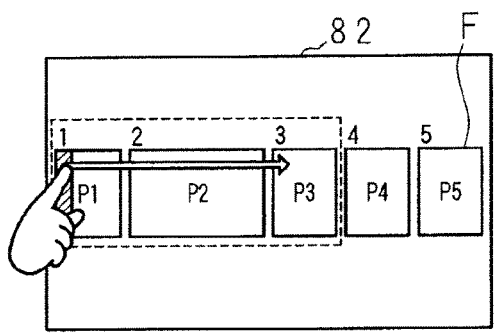
FIG. 8B2
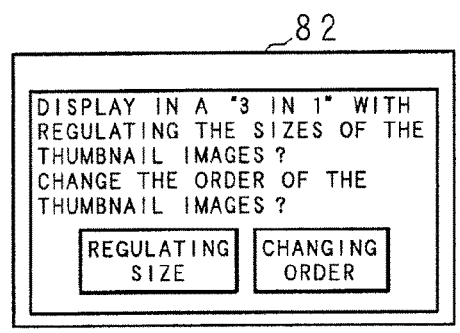
FIG. 8C
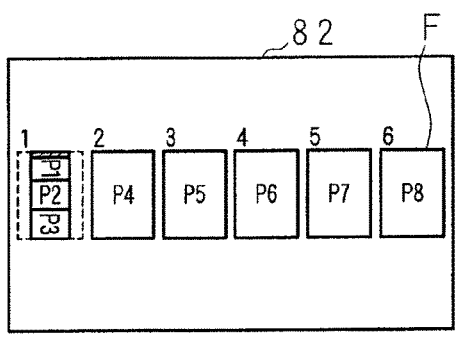
FIG. 8D
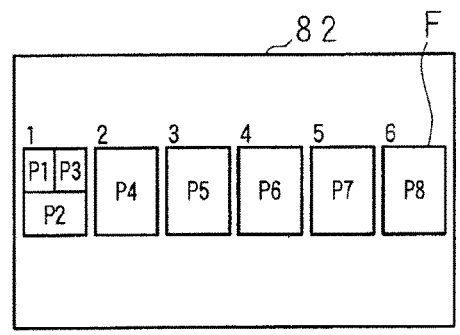

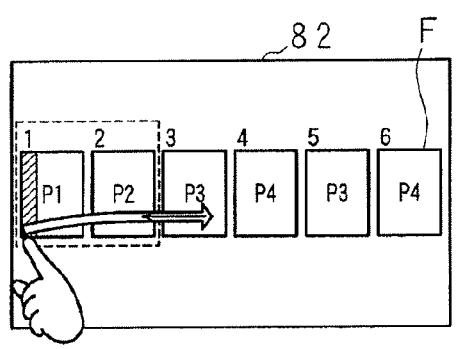
FIG. 9A1
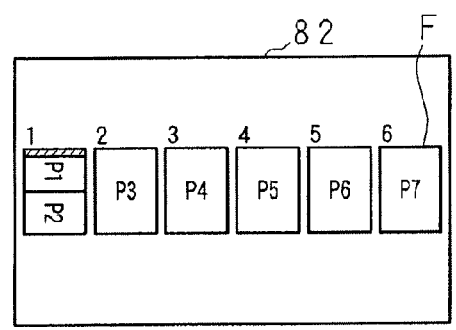
FIG. 9A2

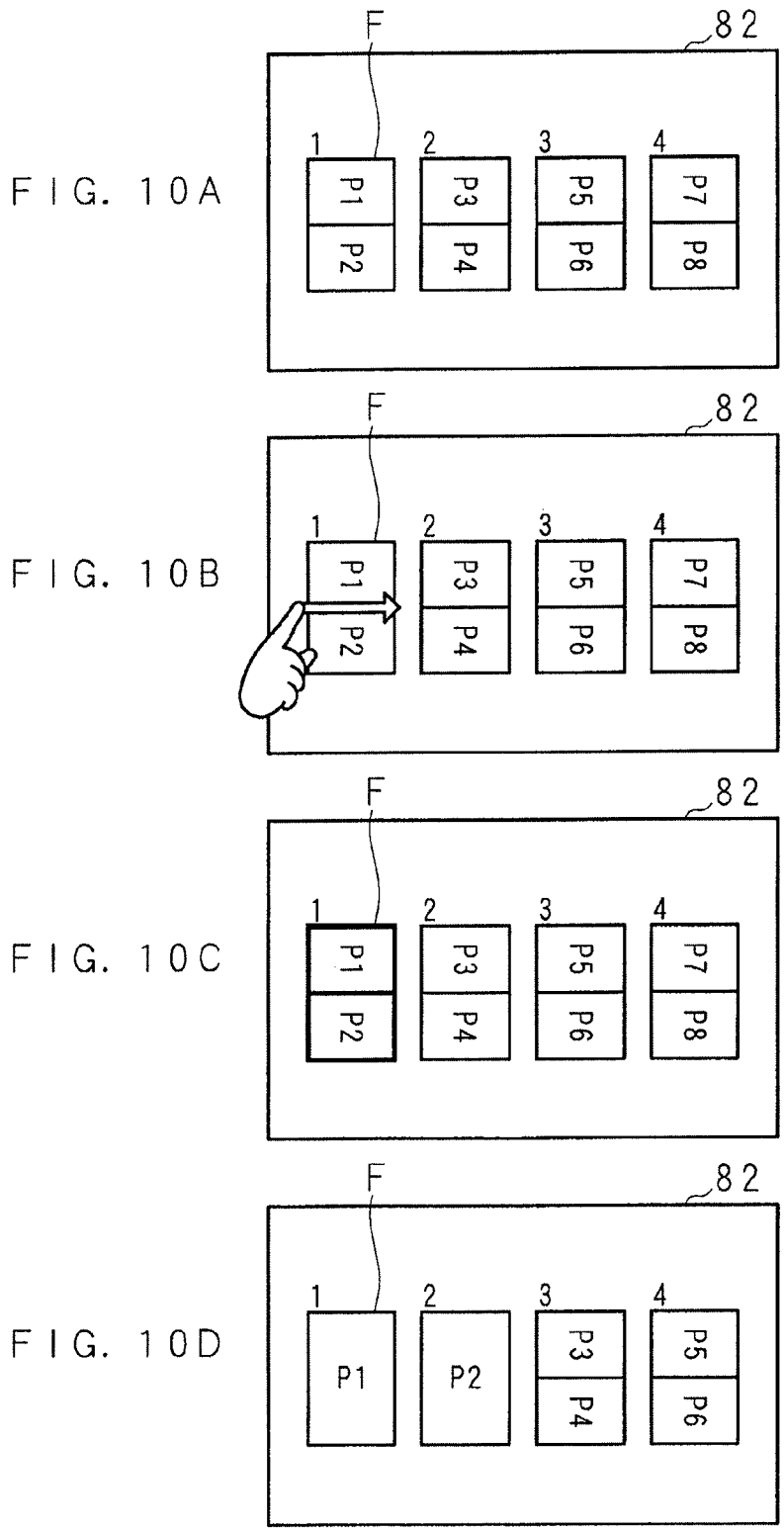

FIG. 13A

| NUMBER OF ORIGINAL THUMBNAIL IMAGES | $2 \times n$ | $2 \times n+1$ |
|---|---|---|
| NUMBER OF THUMBNAIL IMAGES CAPABLE OF BEING DISPLAYED SEPARATELY WITHOUT CHANGING THE NUMBER OF WINDOWS | 0 | 1 |
| NUMBER OF THUMBNAIL IMAGES NEEDED TO BE DISPLAYED IN THE N-UP IMAGE VIEW TO REDUCE THE NUMBER OF WINDOWS | 0 | 1 |

FIG. 13B

| NUMBER OF ORIGINAL THUMBNAIL IMAGES | $4 \times n$ | $4 \times n+1$ | $4 \times n+2$ | $4 \times n+3$ |
|---|---|---|---|---|
| NUMBER OF THUMBNAIL IMAGES CAPABLE OF BEING DISPLAYED SEPARATELY WITHOUT CHANGING THE NUMBER OF WINDOWS | 0 | 3 | 2 | 1 |
| NUMBER OF THUMBNAIL IMAGES NEEDED TO BE DISPLAYED IN THE N-UP IMAGE VIEW TO REDUCE THE NUMBER OF WINDOWS | 0 | 1 | 2 | 3 |

FIG. 16
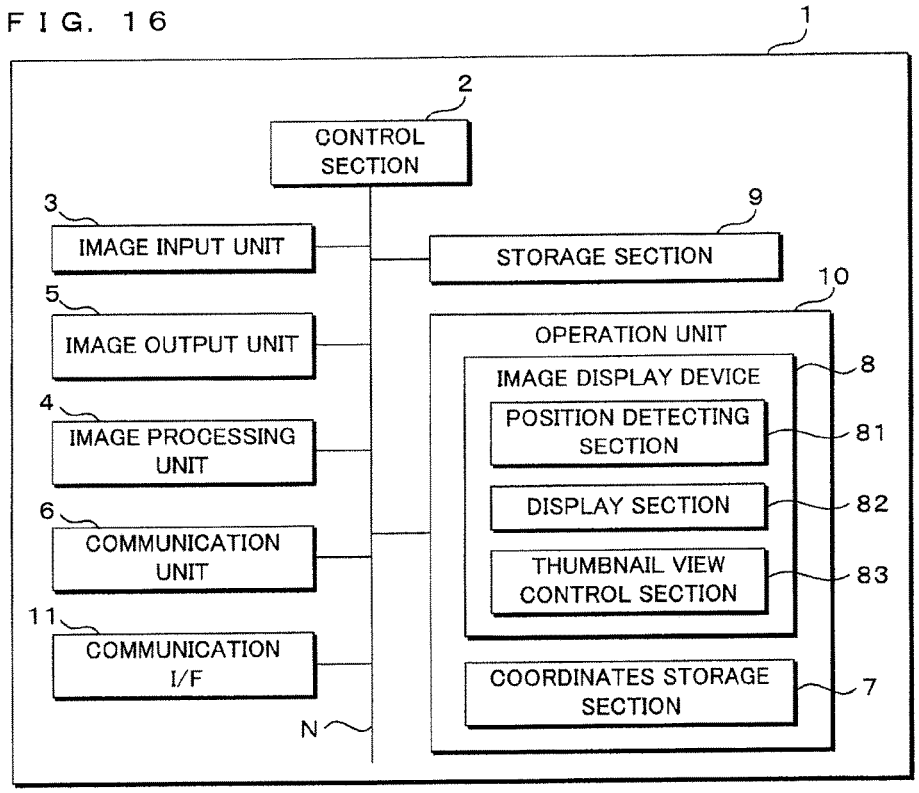
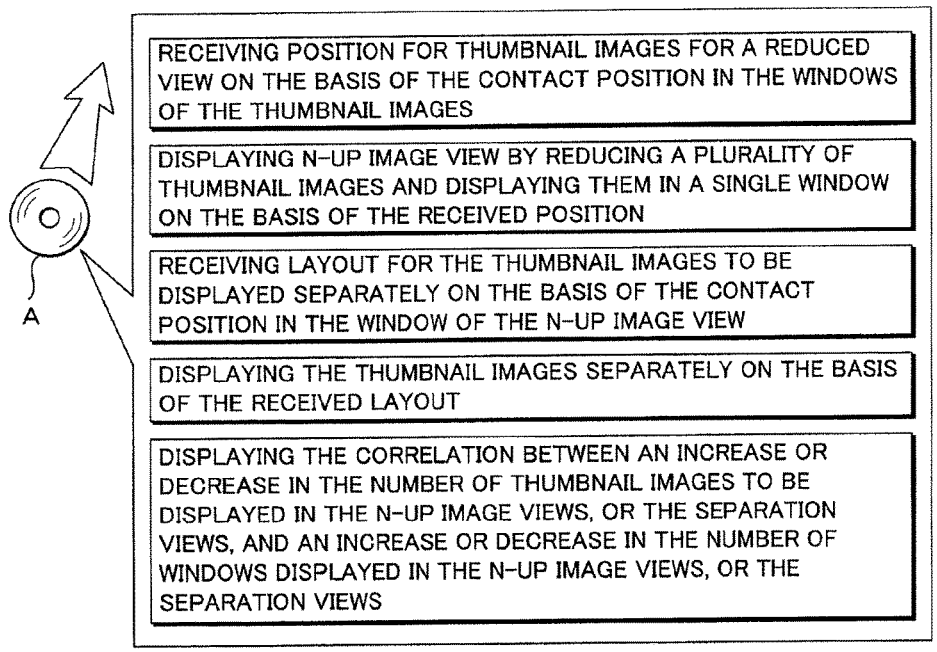

IMAGE DISPLAY APPARATUS WHICH DISPLAYS AN N-UP IMAGE GENERATED FROM A PLURALITY OF THUMBNAIL IMAGES BY A TOUCH OPERATION OF A DISPLAY SCREEN

CROSS-REFERENCE TO RELATED APPLICATION

This application is a Continuation of copending U.S. application Ser. No. 13/076,077, filed on Mar. 30, 2011, which claims priority under 35 U.S.C. § 119(a) on Patent Application No. 2010-82628 filed in Japan on Mar. 31, 2010, the entire contents of which are hereby incorporated by reference.

BACKGROUND

1. Technical Field

The present invention relates to an image display apparatus, an image forming apparatus, an image display method, and, and a recording medium storing the computer program which is capable of displaying a plurality of thumbnail images together in a single window.

2. Description of Related Art

There are widely used image forming apparatuses with a preview function which obtain image data through an image reading apparatus (for example, a scanner), an external recording apparatus, a network etc., generate thumbnail images by performing a process, such as down-sampling of pixels, on the image data, and display the thumbnail images in a display section.

For example, Patent Document 1 discloses an image forming apparatus in which when a user operates a screen on which a preview image is displayed with its finger, the coordinates of the operation start position and the movement amount and direction of the track of the continuously moving finger are detected, and processes and results of change of the preview image (for example, rearrangement, insertion of spacer paper, enlargement/reduction, form overlay, rotation, and deletion of frame) are displayed in a display section according to the detection results (see Japanese Patent Application Laid-Open No. 2004-282439).

Patent Document 2 discloses an image forming apparatus which receives condition settings, such as the number of pages to be aggregated, the order of aggregating document images contained in an aggregated document, a separator between the document images included in the aggregated document, and the orientation of the aggregated document, in an aggregated document view in which a plurality of preview images are aggregated into a single page and displayed, and displays an aggregated document of preview images of selected documents on the basis of the conditions (see Japanese Patent Application Laid-Open No. 2007-306236).

SUMMARY

However, the image forming apparatus of Patent Document 1 does not consider a N-up image view (aggregation) to arrange and display a plurality of thumbnail images in a single window. Therefore, it is difficult to expect the resource saving effect which is achieved when images are formed (printed) on the basis of the images in the N-up image view because the amount of recording paper to be used is reduced.

The image forming apparatus of Patent Document 2 is configured to perform separately the operation of selecting document images to be included in the aggregated document and the operation of determining a layout of the document images in the above-mentioned aggregated document view. Hence, if the aggregated document includes a large number of document images, the operations are complicated, and a lot of time and work are required.

The present invention has been made with the aim of solving the above problems, and it is an object of the present invention to provide an image display apparatus, an image forming apparatus, an image display method, and a recording medium storing the computer program, which are capable of displaying a N-up image view with a simplified operation in which when displaying a N-up image view by grouping thumbnail images displayed in given windows and placing them in a single window by using detecting means for detecting a contact position on a display screen of a display section, a position for each thumbnail image in the N-up image view is received based on a contact position in the window of the thumbnail image, and the N-up image view is displayed based on the received position, whereby, when displaying a N-up image view to display a plurality of thumbnail images in a single window, a selection of thumbnail images and positions are received together only by the operation of selecting thumbnail images to be displayed, and an operation for determining positions of thumbnail images in the N-up image view is not required.

Another object of the present invention is to provide an image display apparatus, an image forming apparatus, an image display method, and a recording medium storing the computer program, which, when separately displaying thumbnail images displayed in a N-up image view, receive a layout for the thumbnail images for separation views on the basis of a contact position in the window of the N-up image view, and display separation views of the thumbnail images on the basis of the received layout, whereby a selection of thumbnail images to be separately displayed and the layout for the separation views are received together, and the thumbnail images are separately displayed by a further simplified operation.

The image display apparatus according to the present invention is an image display apparatus including a display section for displaying a plurality of thumbnail images displayed with given windows, and a position detecting section for detecting a contact position by sensing of a contact on a display screen of the display section, and capable of reducing and displaying a plurality of thumbnail images in a single window based on a detection result by the position detecting section, the image display apparatus comprising: a position receiving section for receiving, based on a contact position in a window of a thumbnail image, a position for each thumbnail image to be displayed in a reduced size; and a N-up image display section for displaying a N-up image view in which a plurality of thumbnail images are reduced and placed in a single window based on position received by the position receiving section.

In this invention, in order to reduce and display a plurality of thumbnail images in a single new window, a user makes contact with the inside of the windows of thumbnail images to be reduced and displayed. In this case, the position detecting section detects the contact position, and the position receiving section receives position for the thumbnail images in a new window for a reduced view (namely, a N-up image view) of the thumbnail images in the new window, based on the contact position in the window. For example, when the user makes contact with the bottom left side in the window of a thumbnail image on the left end of thumbnail images displayed in parallel, a N-up image view is displayed so that the bottom left side of the thumbnail image is placed on the top left side in a new window.

The image display apparatus according to the present invention is an image display apparatus, further comprising a separation display section for separation view in which thumbnail images displayed in the N-up image view are separately displayed to each image, wherein the position receiving section receives a layout for the thumbnail images to be separately displayed, based on a contact position in the window of the N-up image view, and the separation display section displays the separation view of the thumbnail images based on the layout.

In this invention, when the position receiving section receives a layout for the thumbnail images in the separation views based on the contact position in the window of a N-up image view, the separation display section displays the thumbnail images in the N-up image view separately based on the layout.

The image display apparatus according to the present invention is an image display apparatus, further comprising an variation display section for displaying a correlation between an increase or decrease in the number of thumbnail images to be displayed in the N-up image views or the separation views and an increase or decrease in the number of windows displayed in the N-up image views or the separation views.

In this invention, the variation display section displays a correlation between an increase or decrease in the number of thumbnail images to be displayed in the N-up image views or the separation views and an increase or decrease in the number of windows displayed in the N-up image views or the separation views.

The image display apparatus according to the present invention is an image display apparatus, further comprising a storage section for storing a relation between the number of thumbnail images to be displayed in the N-up image views or the separation views and the number of windows displayed in the N-up image views or the separation views, wherein the variation display section displays the correlation, based on contents stored in the storage section.

In this invention, the storage section stores a relation between the number of thumbnail images to be displayed in the N-up image views or the separation views and the number of windows displayed in the N-up image views or the separation views, and the variation display section displays the correlation, based on the contents stored in the storage section.

The image forming apparatus according to the present invention is an image forming apparatus comprising: an image display apparatus defined above; and an image output unit for outputting on a sheet an image corresponding to a thumbnail image in a window displayed in the display section of the image display apparatus.

In this invention, when the display section of the image display apparatus displays thumbnails images in a N-up image view or separation views, the image output unit outputs images corresponding to the thumbnail images according to the layout of the thumbnails images displayed in the N-up image view or the separation views.

The image display method according to the present invention is an image display method for use in an image display apparatus including a display section for displaying a plurality of thumbnail images displayed with given windows, and a position detecting section for detecting a contact position by sensing of a contact on a display screen of the display section, for reducing and displaying a plurality of thumbnail images in a single window based on a detection result by the position detecting section, or displaying separation view in which the thumbnail images displayed in a reduced size are separately displayed, the image display method comprising: a position receiving step for receiving, based on a contact position in a window of a thumbnail image, a position for each thumbnail image to be displayed in a reduced size; and a N-up image display step for displaying a N-up image view in which a plurality of thumbnail images are reduced and placed in a single window based on position received in the position receiving step.

The recording medium according to the present invention is an non-transitory computer-readable recording medium storing a computer program for causing a computer in an image display apparatus, which includes a display section for displaying a plurality of thumbnail images displayed with given windows, and a position detecting section for detecting a contact position by sensing of a contact on a display screen of the display section, to reduce and display a plurality of thumbnail images in a single window, or display separation view in which the thumbnail images displayed in a reduced size are separately displayed, based on a detection result by the position detecting section, said computer program comprising: a position receiving step for causing the computer to receive, based on a contact position in a window of a thumbnail image, a position for each thumbnail image to be displayed in a reduced size; and a N-up image display step for causing the computer to display a N-up image view in which a plurality of thumbnail images are reduced and placed in a single window based on position received in the position receiving step.

In this invention, in order to reduce and display a plurality of thumbnail images in a single new window, a user makes contact with the inside of the windows of thumbnail images to be reduced and displayed. In this case, the position where the user made contact (contact position) is detected, and position for the thumbnail images in the new window for a reduced view (namely, a N-up image view) of the thumbnail images in the new window are received based on the contact position in the windows.

The image display method according to the present invention is an image display method, further comprising: a layout receiving step of receiving a layout for the thumbnail images to be separately displayed, based on a contact position in the window of the N-up image view; and a separation display step for displaying the separation view of the thumbnail images based on the layout received in the layout receiving step.

The recording medium according to the present invention is an non-transitory computer-readable recording medium, wherein said computer program further comprises: a layout receiving step of causing the computer to receive a layout for the thumbnail images to be separately displayed, based on a contact position in a window of the N-up image view; and a separation display step for causing the computer to display the separation views of the thumbnail images based on the layout received in the layout receiving step.

In this invention, a layout for the thumbnail images to be displayed in the separation views is received based on the contact position in the window of the N-up image view, and the thumbnail images displayed in the N-up image view are separately displayed based on the received layout.

The image display method according to the present invention is an image display apparatus, further comprising an display step for displaying a correlation between an increase or decrease in the number of thumbnail images to be displayed in the N-up image views or the separation views and an increase or decrease in the number of windows displayed in the N-up image views or the separation views.

The recording medium according to the present invention is an non-transitory computer-readable recording medium, wherein said computer program further comprises: a display step of causing the computer to display a correlation between an increase or decrease in the number of thumbnail images to be displayed in the N-up image views or the separation views and an increase or decrease in the number of windows displayed in the N-up image views or the separation views.

In this invention, the display section displays a correlation between an increase or decrease in the number of thumbnail images to be displayed in the N-up image views or the separation views and an increase or decrease in the number of windows displayed in the N-up image views or the separation views when the N-up image views or the separation views are implemented.

In this invention, the above-mentioned computer program is recorded in the recording medium. The above-mentioned image display apparatus, image forming apparatus, and image display method are implemented by reading the computer program from the recording medium by a computer.

In this invention, when displaying a N-up image view in which a plurality of thumbnail images are displayed in a single window, a selection of thumbnail images to be displayed and positions are received together only by the operation of selecting thumbnail images to be displayed, and an operation for determining positions of the thumbnail images in the N-up image view is not required, and thus the N-up image view is implemented by a further simplified operation.

According to the present invention, a selection of thumbnail images to be displayed separately and a layout for the separation views are received together, and thus the separation views are implemented by a further simplified operation.

The above and further objects and features will more fully be apparent from the following detailed description with accompanying drawings.

BRIEF DESCRIPTION OF THE SEVERAL VIEWS OF THE DRAWINGS

FIG. 2 is a functional block diagram illustrating essential configurations of an image processing device and an operation device of the digital multi-function printer of Embodiment 1 of the present invention.

FIGS. 5A1-5D2 each illustrates one example of the N-up image view in the digital multi-function printer of Embodiment 1 of the present invention.

FIGS. 6A1-6C2 illustrate other examples of the N-up image view in the digital multi-function printer of Embodiment 1 of the present invention.

FIGS. 7A1, 7A2, 7B-7D illustrate other examples of the N-up image view in the digital multi-function printer of Embodiment 1 of the present invention.

FIGS. 8A1, 8A2, 8B1, 8B2, 8C and 8D illustrate other examples of the N-up image view in the digital multi-function printer of Embodiment 1 of the present invention.

FIGS. 9A1 and 9A2 are explanatory views for explaining how to deal with improper operation made in the digital multi-function printer of Embodiment 1 of the present invention.

FIGS. 10A-10D illustrate one example of separation view in the digital multi-function printer of Embodiment 1 of the present invention.

FIGS. 13A and 13B are conceptual views illustrating conceptually a variation relation table stored in a variation relation storage section of the digital multi-function printer of Embodiment 1 of the present invention.

FIG. 16 is a functional block diagram illustrating an essential configuration of a digital multi-function printer according to Embodiment 2 of the present invention.

DETAILED DESCRIPTION OF THE INVENTION

The following description will explain in detail the present invention by way of examples in which an image display apparatus, an image forming apparatus, an image display method, and a recording medium according to the present invention are applied to a digital multi-function printer having a copy function, a print function etc.

(Embodiment 1)

A digital multi-function printer according to Embodiment 1 of the present invention is configured to be capable of displaying a thumbnail image in a window of a given size on the basis of obtained image data, or displaying a N-up image view in which a plurality of thumbnail images are reduced, arranged and displayed as a single thumbnail image in a single window of a size equal to the above-mentioned window, and a separation view for separating thumbnail images in the N-up image view and displaying them in original size.

Figure 1:
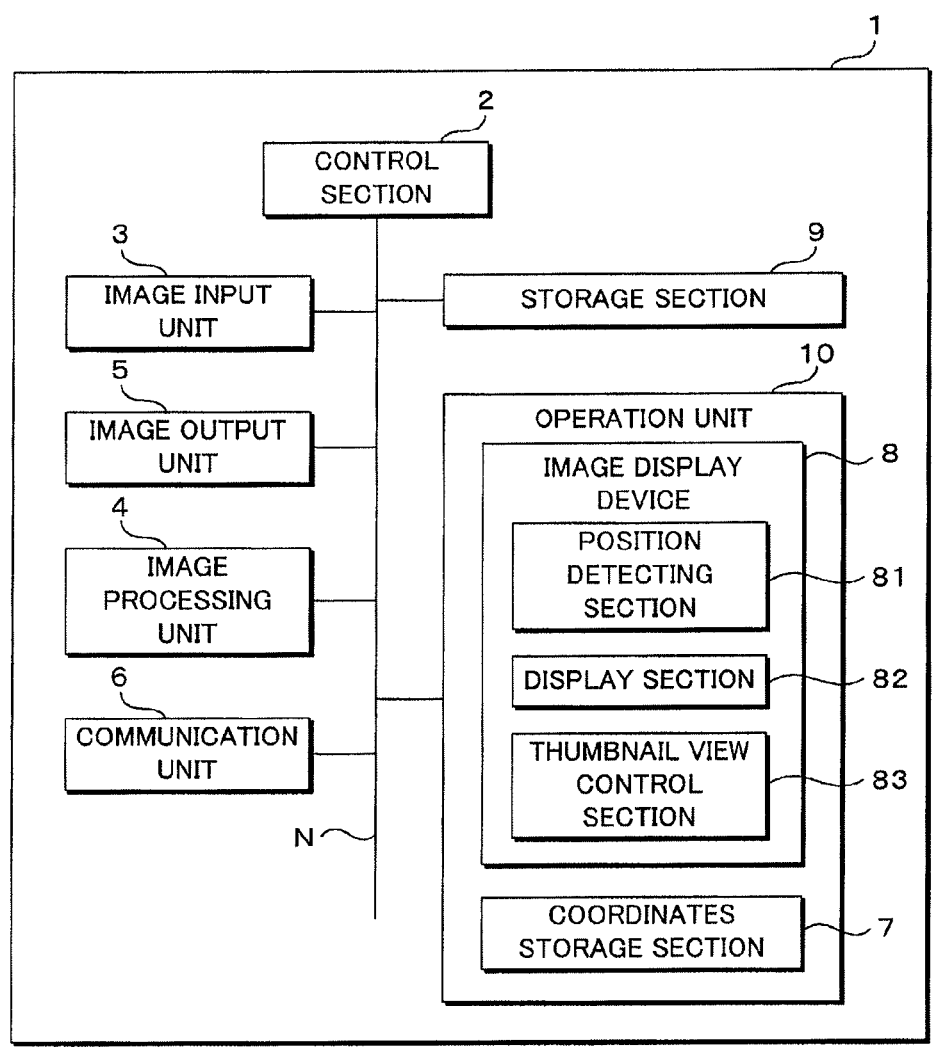
FIG. 1 is a block diagram illustrating an essential configuration of a digital multi-function printer according to Embodiment 1 of the present invention.

FIG. 1 is a block diagram illustrating an essential configuration of a digital multi-function printer 1 according to Embodiment 1 of the present invention. The digital multi-function printer 1 of Embodiment 1 of the present invention comprises: a control section 2; an image input unit 3; an image output unit 5; an image processing unit 4; a communication unit 6; a storage section 9; and an operation unit 10. These hardware devices are connected with a bus N. The operation unit 10 comprises an image display device 8, and a coordinates storage section 7.

FIG. 2 is a functional block diagram illustrating essential configurations of the image processing unit 4 and the operation unit 10 of the digital multi-function printer 1 of Embodiment 1 of the present invention.

The control section 2 comprises a CPU, a ROM, and a RAM (not shown). The ROM stores in advance various kinds of control programs, a program for creating thumbnail images, a program for displaying a N-up image view of thumbnail images, a program for displaying thumbnail images displayed in a N-up image view separately, and data. The RAM is capable of storing a plurality of pieces of data, and allows the data to be read regardless of the order and place they are stored. In addition, the RAM temporarily stores, for example, a program read from the ROM, data generated by executing the program, data received from an external device, etc. The RAM suitably reads out various kinds of stored data according to a read instruction from the CPU.

The CPU controls the above-mentioned various types of hardware by loading and executing the control programs stored in the ROM so that the digital multi-function printer 1 operates as an image display apparatus and an image forming apparatus according to Embodiment 1 of the present invention.

The image input unit 3 optically reads an image on a document. The image input unit 3 comprises a light source for irradiating light on a document to be read, for example, an image sensor such as a CCD (Charge Coupled Device). In the image input unit 3, a reflected light image from a document set on a scanner platen is focused onto the image sensor to output RGB (R: Red, G: Green, B; Blue) analog data. The analog data outputted from the image input unit 3 is inputted to the image processing unit 4.

The image output unit 5 prints an image based on image data of CMYK data outputted from the image processing unit 4 on a sheet of recording paper, OHP film, etc. The image output unit 5 comprises: a charger for charging a photoreceptor to a given electric potential; a laser scanning unit for generating an electrostatic latent image on the photoreceptor by emitting laser light according to image data received from an external device; a developing unit for supplying toner to the electrostatic latent image formed on the photoreceptor surface to visualize the image; and a transfer unit for transferring a toner image formed on the photoreceptor surface to a sheet, and forms an image desired by a user on a sheet by an electrophotographic method.

The communication unit 6 comprises a network card, a modem etc. for receiving image data for thumbnail images to be displayed on the image display device 8 from an external device and sending the image data to an external device, and sends and receives, for example, mails to which the image data is attached.

The storage section 9 is a non-volatile semiconductor memory, for example, assigns numbers to image data read by the image input unit 3, or image data obtained from an external device through the communication unit 6, and thumbnail images based on the image data, and stores the respective image data, thumbnail images and numbers in association with each other.

Moreover, the storage section 9 stores a position for the N-up image view or a layout for the separation view which are received by a later-described position receiving section 831 through the position detecting section 81. The storage section 9 stores a segmentation table for the window in order for the position receiving section 831 to receive the position (also referred to position specification) and the layout (also referred to layout specification) through the position detecting section 81.

Figure 3:
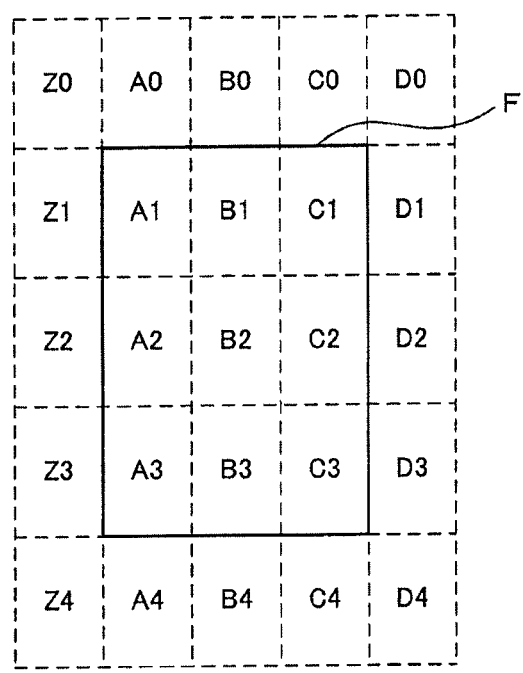
FIG. 3 is a conceptual view illustrating conceptually a segmentation table stored in a storage section of the digital multi-function printer of Embodiment 1 of the present invention.

FIG. 3 is a conceptual view illustrating conceptually the segmentation table stored in the storage section 9 of the digital multi-function printer 1 of Embodiment 1 of the present invention. The inside and outside of a window F in which thumbnail image is to be displayed are segmented by rectangular unit regions with a given area, and each unit region is indicated with a given number.

For example, when a user touches a given position in the window F, the position detecting section 81 detects the position corresponding to the touch, and a later-described position receiving section 831 compares the detection result with the segmentation table to detect whether the left side (A1, A2 or A3) in the window F or the right side (C1, C2 or C3) was touched. Then, based on the detection result, the position receiving section 831 receives a position specification for thumbnail images for the N-up image view, or a layout specification for thumbnail images for the separation view.

The image processing unit 4 generates, for example, digital image data on the basis of analog data inputted through the image input unit 3, or retrieves image data stored in the storage section 9, performs processing according to the type of each image, and then generates output image data. The output image data is outputted to the image output unit 5, or the communication unit 6. The image processing unit 4 also generates thumbnail images on the basis of image data obtained from the image input unit 3, the communication unit 6, or the storage section 9.

The image processing unit 4 comprises: an A/D (analog/digital) conversion section 40; a shading correction section 41; an input processing section 42; a segmentation process section 48; a color correction section 44; a black generation and under color removal section 45; a spatial filter process section 46; a halftone generation section 47; and a display control section 49.

For example, analog data of an image read by the image input unit 3 is sent to the A/D conversion section 40, the shading correction section 41, the input processing section 42, the segmentation process section 48, the color correction section 44, the black generation and under color removal section 45, the spatial filter process section 46, and the halftone generation section 47 in this order (in the direction of arrows) in the image processing unit 4, and outputted as CMYK digital color data to the image output unit 5.

The A/D conversion section 40 converts RGB analog data sent from the image input unit 3 into digital data, and the shading correction section 41 performs a process for removing various types of distortion caused in the illumination system, focusing system, and image capturing system of the image input unit 3 on the digital RGB data sent from the A/D conversion section 40.

The input processing section 42 corrects γ for the RGB data (RGB reflectance data) from which various types of distortion were removed in the shading correction section 41, adjusts the color balance, and performs at the same time a process for converting the data into density (pixel value) data.

The display control section 49 generates thumbnail images based on image data of a document read by the image input unit 3, and retrieves from the storage section 9 image data corresponding to thumbnail images according to a selection made by the user and received through the operation section 10 (position detecting section 81), generates images based on the image data and displays the images in the display section 82.

The segmentation process section 48 separates, based on the RGB data from the input processing section 42, the respective pixels in the input image data into either of regions, such as a character (text) region, a halftone region, and a photograph region (continuous tone region). Based on the separation results, the segmentation process section 48 outputs segmentation class signal indicating to which region a pixel belongs to the black generation and under color removal section 45, the spatial filter section 46, and the half tone generation section 47.

The color correction section 44 generates CMY (C: cyan, M: magenta, Y: yellow) data which is complementary color of RGB data, and performs a process for removing color impurity on the basis of spectral characteristics of CMY color materials containing unnecessary absorption components in order to improve color reproducibility.

The black generation and under color removal section 45 performs black generation for generating black (K) data from CMY three-color data after the color correction, and a process for generating new CMY data by removing the K data generated by black generation from the original CMY data in order to convert the CMY three-color data into CMYK four-color data.

The spatial filter process section 46 performs a spatial filter process using a digital filter on image data of the CMYK data inputted from the black generation and under color removal section 45 on the basis of the segmentation class signal so as to prevent blur and granular deterioration of an output image by correcting spatial frequency characteristics.

The halftone generation section 47 performs, for example, a tone reproduction process on the image data of the CMYK data on the basis of the segmentation class signal. The image data of the CMYK data on which the color reproduction process was performed is outputted to the image output unit 5.

The operation unit 10 includes: function buttons for switching functions, such as "Fax", "Copy", "Print", and "Mail", of the digital multi-function printer 1; ten-key; the Enter key for entering a received instruction; and the "Output" or "Copy" key for forming on a sheet an image based on the image data of a document read by the image input unit 3 and an image displayed in the display section 82 of the image display device 8. In addition, the operation unit 10 has the "N-up image view" key for implementing the N-up image view, and the "Separation view" key for implementing the separation view.

The image display device 8 includes the display section 82 composed of a liquid crystal display, for example, for displaying information to be reported to the user, such as the status of the digital multi-function printer 1, the status of a job process, a thumbnail image of an image read, and the confirmation of the contents of operation of the operation unit 10. The image display device 8 comprises: a position detecting section 81 for detecting the contact position with a fingertip of a user on the display screen of the display section 82; and a thumbnail view control section 83 for controlling the view, N-up image view, or separation view of thumbnail images on the display section 82.

The position detection section 81 is, for example, a touch panel, detects a change in the pressure applied by the pressing operation of a fingertip of a user, or detects an electric signal caused by static electricity, to detect the coordinates of the contact point of the fingertip of the user on the screen of the display section 82, and generates a signal indicating the coordinates. The position detecting section 81 is a so-called multi touch panel capable of recognizing a plurality of points, and, when a plurality of points are specified, is capable of recognizing each of the points individually.

The coordinates storage section 7 stores, based on the signal from the position detecting section 81, the coordinates of the contact point of the fingertip of the user on the screen of the display section 82. For example, the coordinates storage section 7 stores the coordinates of a touched point when the position detecting section 81 was touched, and the coordinates of a slide start point and a release point when the user performed a so-called a slide operation.

Figure 4:
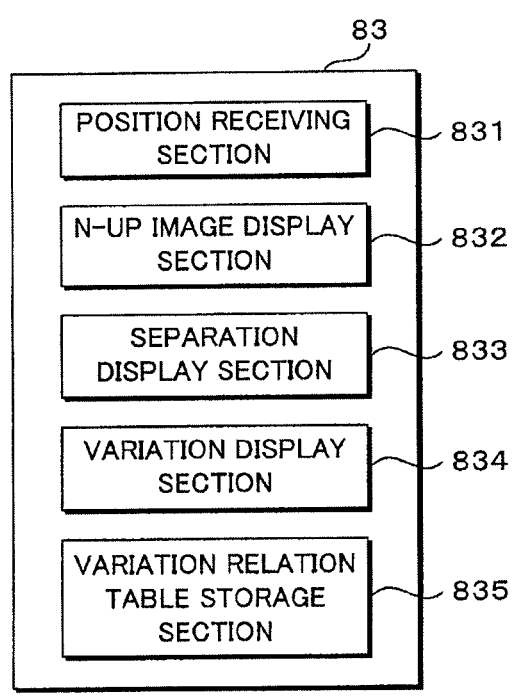
FIG. 4 is a functional block diagram illustrating an essential configuration of a thumbnail view control section of the digital multi-function printer of Embodiment 1 of the present invention.

FIG. 4 is a functional block diagram illustrating an essential configuration of a thumbnail view control section 83 of the digital multi-function printer 1 of Embodiment 1 of the present invention. The thumbnail view control section 83 comprises: a position receiving section 831; a N-up image display section 832; a separation display section 833; an variation display section 834; and an variation relation table storage section 835 (storage section).

The position receiving section 831 receives position specifications for thumbnail images in the above-mentioned N-up image view and a layout specification for each thumbnail image in the above-mentioned separation view, based on the touched position in the window F detected by the position detecting section 81 and the above-mentioned segmentation table.

The N-up image display section 832 reduces a plurality of thumbnail images and arranges and displays them in a single window F as a single thumbnail image, based on the position specifications for the N-up image view of the thumbnail images received by the position receiving section 831.

The separation display section 833 separately displays the thumbnail images displayed in the N-up image view, based on the above-mentioned layout specification for the thumbnail images in the separation views received by the position receiving section 831.

More specifically, the display section 82 has the "Ecology" soft key (not shown). When the user operates the "Ecology" soft key, a N-up image view is displayed as a default in which two thumbnail images are reduced and displayed in a single window F as a single thumbnail. Based on the layout specification given by the user and received through the position receiving section 831 with respect to the two thumbnail images in a single window F thus displayed in the N-up image view, the separation display section 833 separates the thumbnail images and displays them individually.

The following will explain the functions of the position receiving section 831, the N-up image display section 832, and the separation display section 833 in Embodiment 1 of the present invention.

When receiving position specifications for thumbnail images for a N-up image view, the position receiving section 831 receives the position specifications, based on the order in which the thumbnail images are touched and the touched position in the window F. This will be described below by giving a specific example. To simplify the explanation, the case where two thumbnail images are reduced and displayed as a single thumbnail in a window F (two images are reduced and displayed in the same size as the original window size, that is, a so-called "2 in 1") will be referred to as the "2 in 1" view, the case where three thumbnail images are reduced and displayed as a single thumbnail image in a window F will be referred to as the "3 in 1" view, and the case where four thumbnail images are reduced and displayed as a single thumbnail image in a window F will be referred to as the "4 in 1" view.

First, examples of the "2 in 1" view will be explained. FIGS. 5A1-5D2 each illustrates one example of the N-up image view in the digital multi-function printer 1 of Embodiment 1 of the present invention. Each of thumbnail images based on image data of 6 pages of document read by the image input unit 3 is displayed with a number in a rectangular window F of a given size.

In the "2 in 1" view, the user touches or slides its fingertip on thumbnail images to be displayed in the "2 in 1" view (see FIG. 5A1). At this time, the position receiving section 831 receives a position specification to place the thumbnail image which was touched first top and arrange a side corresponding to the touched position to be the top side.

Specifically, in the example of FIG. 5A1, after touching the left side of the "P1" thumbnail image in FIG. 5A1, the user touches the "P2" thumbnail image, or slides its fingertip to the "P2" thumbnail image. Based on the detection result by the position detecting section 81 and the segmentation table, the position receiving section 831 receives a position specification to place the "P1" thumbnail image top and arrange the left side of the "P1" thumbnail image to be the top side. Further, similarly to the "P1" thumbnail image, the position receiving section 831 recognizes that a position specification to place the "P2" thumbnail image bottom is received.

Next, based on the position specifications received by the position receiving section 831, the N-up image display section 832 reduces the "P1" thumbnail image and places this top so that the left side of the "P1" thumbnail image is arranged to be the top side, and reduces the "P2" thumbnail image and places this bottom to display a "2 in 1" view in which the two thumbnail images are displayed one above another as a single thumbnail in a single window F (see FIG. 5A2). Thus, by only touching with its fingertip thumbnail images to be displayed in the "2 in 1" view, the user also makes position specifications for the thumbnail images in the "2 in 1" view, thereby making it possible to omit time-consuming operations for the N-up image view.

Alternatively, as illustrated in FIG. 5B1 and FIG. 5B2, after touching the right side of the "P2" thumbnail image in FIG. 5B1, when the user touches the "P1" thumbnail image, the position receiving section 831 receives a position specification to place the "P2" thumbnail image top and arrange the right side of the "P2" thumbnail image to be the top side. Further, similarly to the "P2" thumbnail image, the position receiving section 831 recognizes that a position specification to place the "P1" thumbnail image bottom is received.

Based on the position specifications received by the position receiving section 831, the N-up image display section 832 reduces the "P2" thumbnail image and places this top so that the right side of the "P2" thumbnail image is arranged to be the top side, and reduces the "P1" thumbnail image and places this bottom to display a "2 in 1" view in which the two thumbnail images are displayed as a single thumbnail image in a single window F.

In the examples illustrated in FIG. 5C1 and FIG. 5C2, after touching the left side of the "P2" thumbnail image in FIG. 5C1, when the user touches the "P1" thumbnail image, the N-up image display section 832 reduces the "P2" thumbnail image and places this top so that the left side of the "P2" thumbnail image is arranged to be the top side, and reduces the "P1" thumbnail image and places this bottom to display a "2 in 1" view in which the two thumbnail images are displayed as a single thumbnail image in a single window F.

The following will explain a case in which two thumbnail images corresponding to image data based on a document printed in a landscape orientation are displayed in a "2 in 1" view by placing them side by side in a single window F.

The user touches with its fingertip thumbnail images to be displayed in the "2 in 1" view (see FIG. 5D1). At this time, the position receiving section 831 receives a position specification to place the thumbnail image which was touched first on the left and arrange a side corresponding to the touched position to be the top side.

For instance, in the case where thumbnail images corresponding to image data based on a document printed in a landscape orientation are displayed, in the example of FIG. 5D1, after touching the right side of the "P1" thumbnail image, the user touches the "P2" thumbnail image. Based on the detection result by the position detecting section 81 and the segmentation table, the position receiving section 831 receives a position specification to place the "P1" thumbnail image on the left and arrange the right side of the "P1" thumbnail image to be the top side. Further, similarly to the "P1" thumbnail image, the position receiving section 831 recognizes that a position specification to place the "P2" thumbnail image on the right of the "P1" thumbnail image is received.

Next, based on the position specifications received by the position receiving section 831, the N-up image display section 832 reduces the "P1" thumbnail image and places this on the left so that the right side of the "P1" thumbnail image is arranged to be the top side, and reduces the "P2" thumbnail image and places this on the right of the "P1" thumbnail image to display a "2 in 1" view in which the two thumbnail images are displayed side by side as a single thumbnail in a single window F (see FIG. 5D2).

Thereafter, for example, when the user presses the Enter key of the operation unit 10, as displayed in the display section 82, images corresponding to the two thumbnail images are formed together on a single sheet of recording paper and outputted. Therefore, compared to image formation in which an image corresponding to a single thumbnail image is formed on one sheet of recording paper, the amount of recording paper to be used is significantly reduced, and the effect of saving resources is obtained.

FIGS. 6A1-6C2 illustrate other examples of the N-up image view in the digital multi-function printer 1 of Embodiment 1 of the present invention.

For example, in the case where two discrete thumbnail images are to be displayed one upon another in a "2 in 1" view instead of displaying two consecutive thumbnail images side by side in a "2 in 1" view, like the above-described technique, the user selects thumbnail images to be displayed in a "2 in 1" view.

More specifically, as illustrated in FIG. 6A1 and FIG. 6A2, after touching the left side of the "P1" thumbnail image, when the user touches the "P3" thumbnail image separated from the "P1" thumbnail image, the position receiving section 831 receives a position specification to place the "P1" thumbnail image top and arrange the left side of the "P1" thumbnail image to be the top side. Further, similarly to the "P1" thumbnail image, the position receiving section 831 recognizes that a position specification to place the "P3" thumbnail image bottom is received.

Based on the position specifications received by the position receiving section 831, the N-up image display section 832 reduces the "P1" thumbnail image and places this top so that the left side of the "P1" thumbnail image is arranged to be the top side, and reduces the "P3" thumbnail image and places this bottom to display a "2 in 1" view in which the two thumbnail images are displayed as a single thumbnail image in a single window F.

The following will explain a "4 in 1" view in which consecutive four thumbnail images are displayed in a single window F.

The user touches and slides its fingertip over the consecutive four thumbnail images (see FIG. 6B1). At this time, the position receiving section 831 receives a position specification to place the thumbnail image which was touched first on the top left side and arrange a side corresponding to the touched position to be the top side.

More specifically, in the example illustrated in FIG. 6B1, after touching the top left of the "P1" thumbnail image, the user slides its fingertip over the "P2", "P3" and "P4" thumbnail images in this order. Based on the detection result by the position detecting section 81 and the segmentation table, the position receiving section 831 receives a position specification to place the "P1" thumbnail image on the top left side and arrange the top side of the "P1" thumbnail image to be the top. Further, similarly to the first touch operation on the ("P1") thumbnail image, the position receiving section 831 recognizes that position specifications to place the thumbnail image corresponding to the second touch operation on the top right side, place the thumbnail image corresponding to the third touch operation on the bottom left side, and place the thumbnail image corresponding to the fourth touch operation on the bottom right side are received.

Next, based on the position specifications received by the position receiving section 831, the N-up image display section 832 reduces the "P1" thumbnail image and places this on the top left side so that the top side of the "P1" thumbnail image is arranged to be top, reduces the "P2" thumbnail image and places this on the top right side, reduces the "P3" thumbnail image and places this on the bottom left side, and reduces the "P4" thumbnail image and places this on the bottom right side to display a "4 in 1" view in which the four thumbnail images are displayed as a single thumbnail image in a single window F (see FIG. 6B2).

On the other hand, when displaying a "4 in 1" view of four discrete thumbnail images in a single window F, the user performs substantially the same operation as that for displaying the "4 in 1" view of four consecutive thumbnail images. For instance, after touching the top left of the "P1" thumbnail image, the user touches the "P3", "P2" and "P4" thumbnail images in this order (see FIG. 6C1). Specifically, when displaying the "4 in 1" view, the user touches a thumbnail image to be placed on the top left side, a thumbnail image to be placed on the top right side, a thumbnail image to be placed on the bottom left side, and a thumbnail image to be placed on the bottom right side in this order.

Based on the detection result by the position detecting section 81 and the segmentation table, the position receiving section 831 receives a position specification to place the "P1" thumbnail image on the top left side and arrange the top side of the "P1" thumbnail image to be the top. Further, similarly to the first touch operation on the ("P1") thumbnail image, the position receiving section 831 recognizes that position specifications to place the thumbnail image corresponding to the second touch operation ("P3") on the top right side, place the thumbnail image corresponding to the third touch operation ("P2") on the bottom left side, and place the thumbnail image corresponding to the fourth touch operation ("P4") on the bottom right side are received.

Based on the position specifications received by the position receiving section 831, the N-up image display section 832 reduces the "P1" thumbnail image and places this on the top left side so that the top side of the "P1" thumbnail image is arranged to be the top, reduces the "P3" thumbnail image and places this on the top right side, reduces the "P2" thumbnail image and places this on the bottom left side, and reduces the "P4" thumbnail image and places this on the bottom right side to display a "4 in 1" view in which the four thumbnail images are displayed as a single thumbnail image in a single window F (see FIG. 6C2).

The following will explain a "3 in 1" view in which three thumbnail images are displayed in a single window F. FIGS. 7A1, 7A2, 7B-7D illustrate other examples of the N-up image view in the digital multi-function printer 1 of Embodiment 1 of the present invention.

For example, when displaying a "3 in 1" view in which consecutive three thumbnail images are displayed in a single window F, the user touches and slides its fingertip over the consecutive three thumbnail images (see FIG. 7A1). When the three thumbnail images are touched, the position receiving section 831 displays in the display section 82 a reception screen for receiving a selection from the user as to whether the thumbnail images are to be displayed in a "3 in 1" view mode or in a "4 in 1" view mode (see FIG. 7A2).

For instance, when the user touches the reception screen and a selection to display thumbnail images in the "3 in 1" view mode is received from the user based on the detection result of the position detecting section 81, the position receiving section 831 receives a position specification to arrange the top left of the thumbnail image ("P1") which was touched first to be the top left side of a new window. Further, similarly to the first touch operation on the thumbnail image ("P1"), the position receiving section 831 recognizes that position specifications to place the thumbnail image corresponding to the second touch operation ("P2") in the middle and place the thumbnail image corresponding to the third touch operation ("P3") on the right side are received. Next, based on the position specifications received by the position receiving section 831, the N-up image display section 832 reduces and displays the "P1", "P2" and "P3" thumbnail images as a single thumbnail image in a single window F in the "3 in 1" view (see FIG. 7B). Thereafter, in order to match the vertical and horizontal ratio with that of the windows of other thumbnail images, the new window and thumbnail image are rotated (see FIG. 7C).

On the other hand, when a selection to display the thumbnail images in the "4 in 1" view mode is received from the user through the reception screen, the position receiving section 831 recognizes that position specifications to place the thumbnail image ("P1") which was touched first on the top left side, the thumbnail image corresponding to the second touch operation ("P2") on the top right side, and the thumbnail image corresponding to the third touch operation ("P3") on the bottom left side, and display a blank page on the bottom right side are received. Next, based on the position specifications received by the position receiving section 831, the N-up image display section 832 reduces the "P1", "P2" and "P3" thumbnail images and displays them as a single thumbnail image in a single window F in the "4 in 1" view (see FIG. 7D).

On the other hand, since there is a variation in the size of documents, it is supposed that thumbnail images based on image data of documents read by the image input unit 3 might be displayed in windows F of different sizes. The following will explain the N-up image view for such a case.

FIGS. 8A1, 8A2, 8B1, 8B2, 8C and 8D illustrate other examples of the N-up image view in the digital multi-function printer 1 of Embodiment 1 of the present invention. The "P3" thumbnail image (window F) is displayed in a larger window F than other thumbnail images (windows F). For the sake of simplifying the explanation, the following will be explained by way of an example in which three consecutive thumbnail images are selected and displayed in a "3 in 1" view.

The user touches and slides its fingertip over the consecutive three thumbnail images (see FIG. 8A1). When the three thumbnail images are touched, the position receiving section 831 determines whether or not the three thumbnail images have the same size. The determination is made, for example, based on the data from a sensor provided in an automatic document feed device of the image input unit 3, or image data of the documents read by the image input unit 3. If the three thumbnail images are not of the same size and the thumbnail image corresponding to the last touch operation has the largest size, then the position receiving section 831 recognizes that position specifications to place the thumbnail image corresponding to the first touch operation on the top left side, the thumbnail image corresponding to the second touch operation on the top right side, and the thumbnail image corresponding to the third touch operation on the bottom side are received. Next, based on the position specifications received by the position receiving section 831, the N-up image display section 832 reduces the "P1", "P2" and "P3" thumbnail images and display them as a single thumbnail image in a single window F in the "3 in 1" view (see FIG. 8A2).

On the other hand, if the three thumbnail images are not of the same size and a thumbnail image which was not touched last has the largest size (see FIG. 8B1), then the position receiving section 831 displays in the display section 82 a reception screen for receiving a selection from the user as to whether the sizes of the thumbnail images are to be regulated, or the order is to be changed (see FIG. 8B2).

For example, when the user touches the reception screen and a selection to regulate the sizes of the thumbnail images is received from the user on the basis of the detection result by the position detecting section 81, the position receiving section 831 instructs the image processing unit 4 to regulate the sizes of the three thumbnail images by performing a process, such as down-sampling of pixels, on the image data of the document read by the image input unit 3. The position receiving section 831 also recognizes that a position specification to place the thumbnail image ("P1") corresponding to the first touch operation top and arrange a side corresponding to the touched position (the left side in FIG. 8B1) to be the top side is received. Further, similarly to the thumbnail image corresponding to the first touch operation ("P1"), the position receiving section 831 recognizes that position specifications to place the thumbnail image corresponding to the second touch operation ("P2") in the middle and the thumbnail image corresponding to the third touch operation ("P3") bottom are received. Next, based on the position specifications received by the position receiving section 831, the N-up image display section 832 reduces the "P1", "P2" and "P3" thumbnail images and display them as a single thumbnail image in a single window F in the "3 in 1" view (see FIG. 8C).

On the other hand, when a selection to change the order is received from the user through the reception screen, the position receiving section 831 recognizes that the largest thumbnail image ("P2") was touched last. Accordingly, the position receiving section 831 recognizes that position specifications to place the thumbnail image ("P1") touched first on the top left side, the thumbnail image corresponding to the third touch operation ("P3) on the top right side, and the thumbnail image recognized as being touched last ("P2") on the bottom side are received. Next, based on the position specifications received by the position receiving section 831, the N-up image display section 832 reduces the "P1", "P2" and "P3" thumbnail images and display them as a single thumbnail image in a single window F for the "3 in 1" view (see FIG. 8D).

Note that, for example, when the user selects thumbnail images to be displayed in the "2 in 1" view, there is a possibility that the user might touch (slide its fingertip over) a thumbnail image which is not supposed to be touched. The following will explain such a case.

FIGS. 9A1 and 9A2 are explanatory views for explaining how to deal with improper operation made in the digital multi-function printer 1 of Embodiment 1 of the present invention. For the sake of simplifying the explanation, the following will be explained by way of an example in which when selecting the "P1" and "P2" thumbnail images by sliding a user's fingertip over them for the "2 in 1" view, the user mistakenly slid its fingertip over the "P3" thumbnail image.

Thus, when the user made an improper operation by sliding its fingertip over the "P3" thumbnail image which was not supposed to be displayed in the "2 in 1" view (see FIG. 9A1), the user needs to follow the track of the mistaken slide operation to slide back its fingertip (indicated with the solid black arrow in FIG. 9A1) and detach the fingertip above the "P2" thumbnail image. At this time, the position receiving section 831 receives a position specification to place the "P1" thumbnail image top and arrange a side corresponding to the touched position (the left side of the "P1" thumbnail) to be the top side. Further, similarly to the "P1" thumbnail image, the position receiving section 831 recognizes that a position specification to place the "P2" thumbnail image bottom is received. Next, based on the position specifications received by the position receiving section 831, the N-up image display section 832 reduces the "P1" and "P2" thumbnail images and display them as a single thumbnail image in a single window F in the "2 in 1" view (see FIG. 9A2).

The following will explain a function of a separation display section 833 for separately displaying thumbnail images displayed in the N-up image view, based on a layout specification for the thumbnail images in the separation views which is received by the position receiving section 831.

FIGS. 10A-10D each illustrates an example of the separation view in the digital multi-function printer 1 of Embodiment 1 of the present invention.

For example, as described above, when the user touches the "Ecology" soft key provided in the display section 82, a "2 in 1" view is displayed by reducing two thumbnail images and displaying them as a single thumbnail image in a single window F (see FIG. 10A).

Next, the user who wishes to separately display given thumbnail images slides its fingertip over a window F in which desired thumbnail images are displayed. This operation is performed from the left to the right along the boundary between two thumbnail images displayed in the window F (see FIG. 10B).

At this time, the slide operation is compared with the segmentation table on the basis of the detection result by the position detecting section 81, and it is found that the order is "A2", "B2", and "C2". The position receiving section 831 receives a position specification to separate two thumbnail images in the window F corresponding to the slide operation so that the top thumbnail image is displayed in front and the bottom thumbnail image is displayed behind. The position receiving section 831 indicates that the window F (number 1) corresponding to the slide operation is in an active state by changing the gradation of display color of the window F (number 1), etc (see FIG. 10C).

Next, based on the position specifications received by the position receiving section 831, the separation display section 833 separates the "P1" and "P2" thumbnail images in the window F of number 1, displays each of the thumbnail images in one window F in the size before they were reduced for the N-up image view, and places and displays the "P1" thumbnail image in front and the "P2" thumbnail image behind the "P1" (see FIG. 10D).

In short, with the slide operation, a selection of thumbnail images to be separately displayed and receiving of a layout specification for the thumbnail images are implemented simultaneously, and therefore the user's operation for the separation views is further simplified.

FIGS. 11A-11D illustrate other examples of the separation view in the digital multi-function printer 1 of Embodiment 1 of the present invention.

Figure 11A:
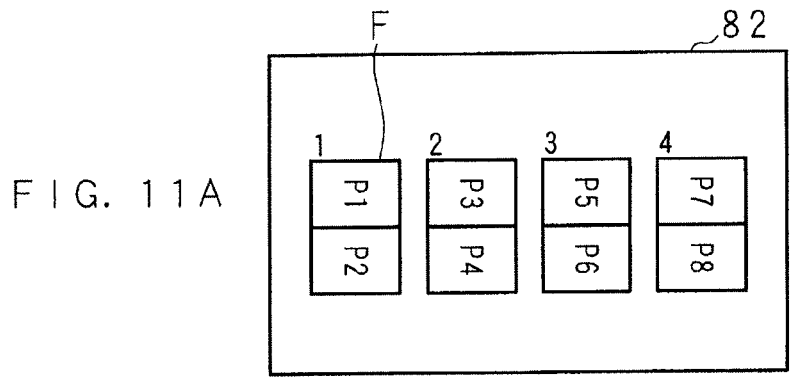
FIGS. 11A-11D illustrate other examples of separation view in the digital multi-function printer of Embodiment 1 of the present invention.

Like the examples of FIGS. 10A-10D, when the user operates the Ecology" soft key provided in the display section 82, a "2 in 1" view is displayed by reducing two thumbnail images and displaying them as a single thumbnail image in a single window F (see FIG. 11A).

Figure 11B:
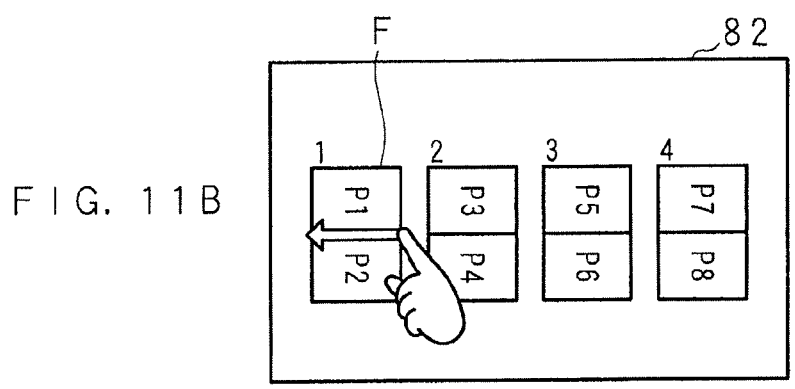
Figure 11C:
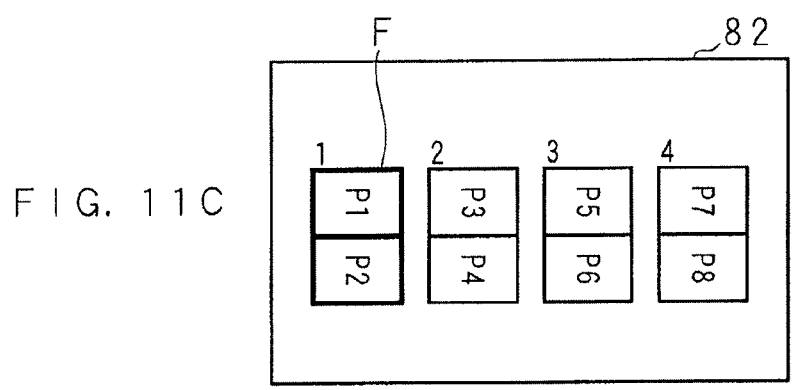

Next, the user who wishes to separately display given thumbnail images slides its fingertip over a window F in which desired thumbnail images are displayed from the right to the left along the boundary between the two thumbnail images displayed in the window F (see FIG. 11B).

At this time, based on the detection result by the position detecting section 81, the position receiving section 831 receives a layout specification to separate the two thumbnail images in the window F corresponding to the slide operation so that the bottom thumbnail image is displayed in front and the top thumbnail image is displayed behind. The position receiving section 831 indicates that the window F (number 1) corresponding to the slide operation is in an active state by changing the gradation of the display color of the window F (number 1), etc. (see FIG. 11C).

Figure 11D:
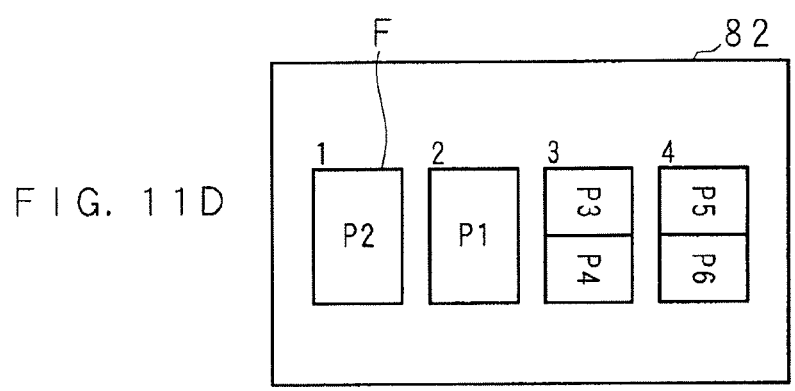

Next, based on the layout specifications received by the position receiving section 831, the separation display section 833 separates the "P1" and "P2" thumbnail images in the window F of number 1, displays each of the thumbnail images in one window F in the size before they were reduced for the N-up image view, and places the "P2" thumbnail image in front and the "P1" thumbnail image behind the "P2" (see FIG. 11D).

The above description meant to explain the N-up image view by way of an example in which one thumbnail image is displayed in one window F, and explain the separation view of a thumbnail image by referring to a window F in the "2 in 1" view as an example, but the present invention is not limited to this. Needless to say, the present invention is applicable, for example, to the N-up image view of windows F displayed in the "2 in 1" or the "4 in 1" view and to the separation views for separating thumbnail images displayed in a window F of the "4 in 1" view and displaying them separately in the "2 in 1" views.

Based on an variation relation table stored in a later-described variation relation table storage section 835, the variation display section 834 displays the correlation between an increase or decrease in the number of thumbnail images to be displayed in the N-up image views or the separation views and an increase or decrease in the number of windows displayed in the N-up image views or the separation views as text in the display section 82.

The following will explain in detail the function of the variation display section 834. FIGS. 12A-12D are explanatory views for explaining the function of the variation display section 834 of the digital multi-function printer 1 of Embodiment 1 of the present invention.

Figure 12A:
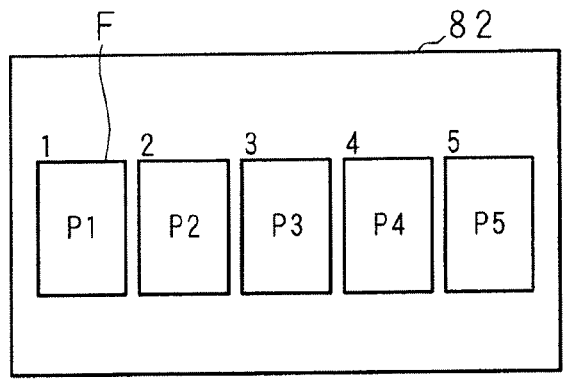
FIGS. 12A-12D are explanatory views for explaining the function of an variation display section of the digital multi-function printer of Embodiment 1 of the present invention.

First, thumbnail images based on the image data of five pages of document read by the image input unit 3 are displayed in rectangular windows F of a given size with numbers, respectively (see FIG. 12A).

Figure 12B:
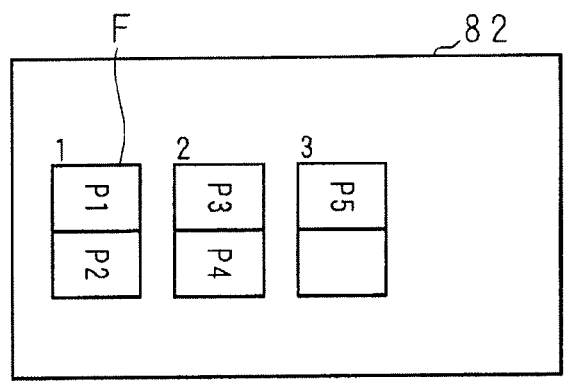
Figure 12C:
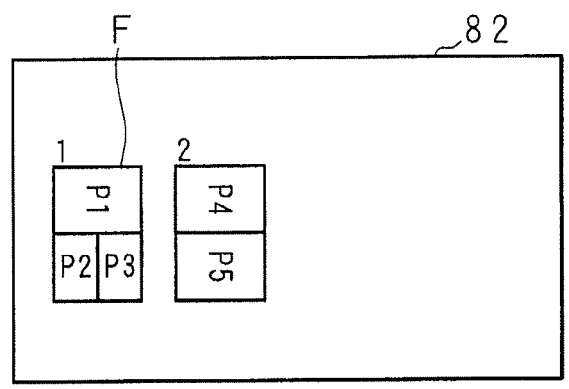
Figure 12D:
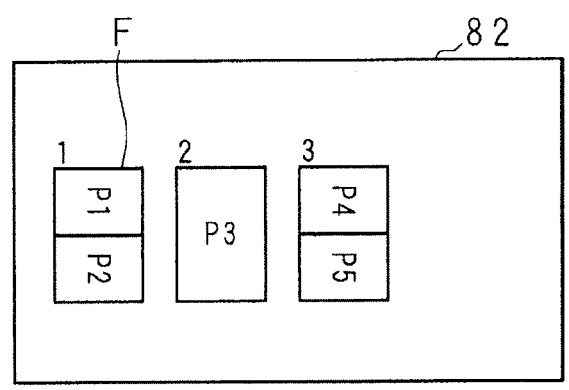

For example, when the user operates the Ecology" soft key provided in the display section 82, a "2 in 1" view is implemented by reducing two thumbnail images and displaying them as a single thumbnail image in a single window F (see FIG. 12B). At this time, the number of the windows F displayed in the display section 82 is reduced from five to three. When formation of image on recording paper is performed in such a state, the consumption of recording paper is reduced by two sheets compared to the case illustrated as an example in FIG. 12A.

At this time, the bottom side of the window F labeled with the number 3 is blank. In other words, only one thumbnail image ("P5") is displayed in the window F labeled with the number 3. In such a case, if the "P5" thumbnail image is assigned to be displayed in the window F labeled with the number 2, that is, if either of the window F labeled with the number 1 or the window F labeled with the number 2 is arranged to display a "3 in 1" view, the window F labeled with the number 3 is not needed. When formation of images on recording paper is performed in such a state, the consumption of recording paper is further reduced by one sheet (see FIG. 12C).

The variation display section 834 displays a message stating the above-mentioned fact in the display section 82. For instance, in the examples illustrated in FIG. 12B and FIG. 12C, the variation display section 834 displays as text in the display section 82 a message stating that the images corresponding to five pages of document are displayed in three windows F, and a message stating that the number of the windows F displayed is further reduced by one if the number of thumbnail images to be assigned to a single window F and displayed in the N-up image view is increased by one.

In the example illustrated in FIG. 12B, the user who wishes to separately display a given thumbnail image (for example, the "P3" thumbnail image) performs the above-mentioned operation to display the "P3" and "P4" thumbnail images separately. Further, by arranging the "P4" and "P5" thumbnail images to be displayed in the N-up image view, only the "P3" thumbnail image is displayed separately. In this case, only the "P3" thumbnail image is displayed separately without increasing the number of the windows F (see FIG. 12D).

The variation display section 834 displays a message stating the above-mentioned fact in the display section 82. For instance, in the examples illustrated in FIG. 12B and FIG. 12D, the variation display section 834 displays as text in the display section 82 a message stating that even if one thumbnail image is displayed separately from the window F of a N-up image view, the total number of the windows F is not increased, that is, the number of the thumbnail images that can be displayed separately without increasing the number of the windows F is one.

In short, as described above, the variation display section 834 displays in the display section 82 the correlation between an increase or decrease in the number of thumbnail images to be displayed in the N-up image views or the separation views and an increase or decrease in the number of windows displayed in the N-up image views or the separation views, and lets the user who views the display realize saving of resources by a reduction in the amount of recording paper to be used.

The variation relation table storage section 835 stores the variation relation table concerning the display of the correlation. The variation relation table contains records of the relation between the number of thumbnail images to be displayed in the N-up image views and the number of windows displayed in the N-up image views. Moreover, the variation relation table contains records of the relation between the number of thumbnail images to be displayed in the separation views and the number of windows displayed in the separation views.

More specifically, "the number of original thumbnail images", "the number of thumbnail images which are needed to be displayed in the N-up image views in order to reduce the number of windows F" when the "Ecology" soft key is pressed, and "the number of thumbnail images capable of being displayed separately without changing the number of windows F" are stored in association with each other.

FIGS. 13A and 13B are conceptual views illustrating conceptually the variation relation table stored in a variation relation table storage section 835 of the digital multi-function printer 1 of Embodiment 1 of the present invention. FIG. 13A illustrates the variation relation table when the "2 in 1" view is implemented, while FIG. 13B illustrates the variation relation table when the "4 in 1" view is implemented.

As illustrated in FIGS. 13A and 13B, for each of the number of original thumbnail images, "the number of thumbnail images capable of being displayed separately without changing the number of windows F" and "the number of thumbnail images needed to be displayed in the N-up image view to reduce the number of windows" are recorded.

Figure 14:
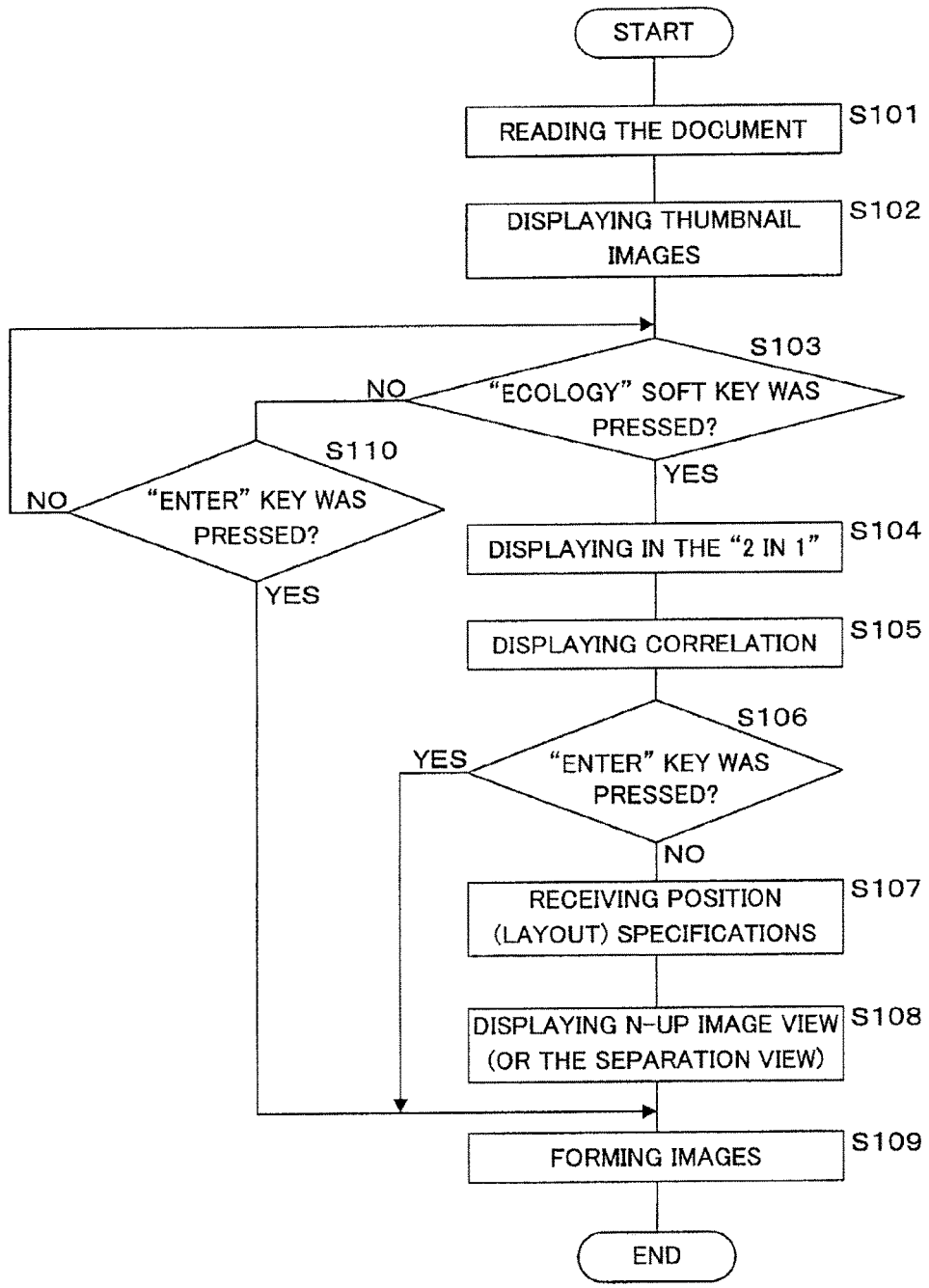
FIG. 14 is a flowchart for explaining one example of the N-up image view (separation view) in the digital multi-function printer of Embodiment 1 of the present invention.

FIG. 14 is a flowchart for explaining one example of the N-up image view (separation view) in the digital multi-function printer 1 of Embodiment 1 of the present invention. For the sake of simplifying the explanation, the following will be explained by way of an example in which five pages of document are read by the image input unit 3, and thumbnail images based on the read image data are displayed in the N-up image views or the separation views.

First, the user places five pages of document on the scanner platen of the image input unit 3 and presses the "Copy" key of the operation unit 10 to instruct reading of the document. The CPU of the control section 2 receives the read instruction from the operation unit 10 and instructs the image input unit 3 to read the document (step S101). The CPU stores the image data of the document thus obtained by the image input unit 3 into the storage section 9.

The CPU instructs the image processing unit 4 to generate thumbnail images on the basis of the image data of the five pages of the document. The thumbnail images generated by the image processing unit 4 are stored in the storage section 9 in association with the image data.

Next, the CPU retrieves the thumbnail images stored in the storage section 9, arbitrarily labels them with numbers and displays them in the display section 82 (step S102). At this time, the thumbnail images are displayed one each in one window F (see FIG. 15A).

Thereafter, the CPU determines on the basis of the detection result by the position detecting section 81 whether or not the above-mentioned "Ecology" soft key was pressed by the user (step S103).

When the CPU determines that the "Ecology" soft key was not pressed (step S103: NO), the processing proceeds to step S110 and the CPU determines whether or not the "Enter" key of the operation unit 10 was pressed (step S110).

When the CPU determines that the "Enter" key was not pressed (step S110: NO), the processing returns to step S103. Whereas when the CPU determines that the "Enter" key was pressed (step S110: YES), the processing proceeds to step S109 and the CPU instructs the image output unit 5 to form (output) images corresponding to the thumbnail images displayed in the display section 82 (step S109).

On the other hand, in step S103, when the CPU determines that the "Ecology" soft key was pressed (step S103: YES), it instructs the N-up image display section 832 to display the five thumbnail images in the "2 in 1" views, and then the N-up image display section 832 displays them in the "2 in 1" views (step S104). This is the case when the "2 in 1" view is set as default, but it is possible to set the "3 in 1" view or the "4 in 1" view as default.

Next, based on the variation relation table stored in the variation relation table storage section 835, the variation display section 834 displays as text in the display section 82 the correlation between an increase or decrease in the number of thumbnail images to be displayed in the N-up image views and an increase or decrease in the number of windows displayed in the N-up image views, and the correlation between an increase or decrease in the number of thumbnail images to be displayed in the separation views and an increase or decrease in the number of windows displayed in the separation views (step S105).

Figure 15A:
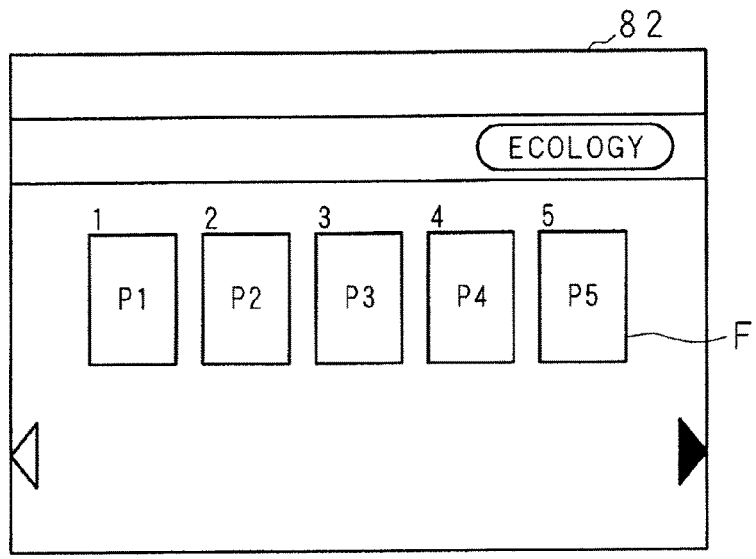
FIGS. 15A and 15B are exemplary views illustrating one example of the N-up image view in the digital multi-function printer of Embodiment 1 of the present invention.
Figure 15B:
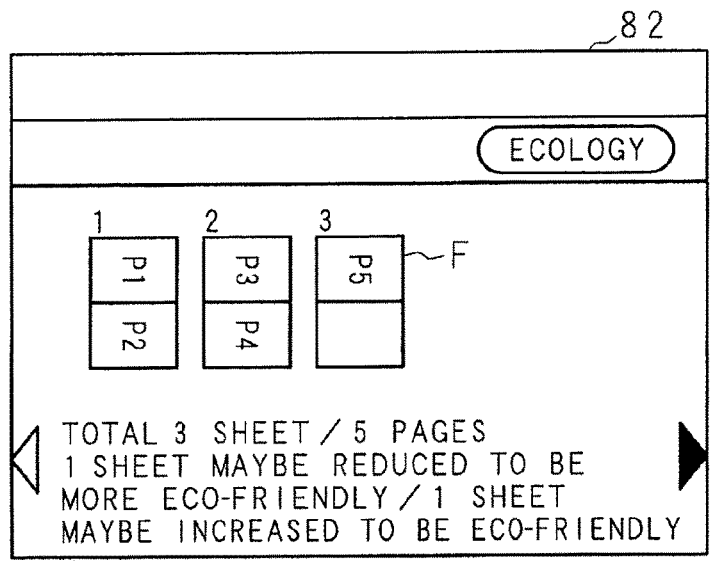

In the example illustrated in FIGS. 15A and 15B, since five thumbnail images are displayed in three windows F in the "2 in 1" views, the variation display section 834 displays as text in the display section 82 a message stating that the images corresponding to the five pages of document are displayed in three windows F, a message stating that the number of the windows F displayed is further reduced by one by increasing the number of thumbnail images to be placed and displayed in a single window F by one, and a message stating that the number of thumbnail images capable of being separated and displayed without increasing the number of the windows F is one (see FIG. 15B). The display of the correlation by the variation display section 834 is implemented as described above, and detailed explanation thereof will be omitted.

Next, based on the detection result by the position detecting section 81, the CPU determines whether or not the "Enter" key of the operation unit 10 was pressed (step S106). When the CPU determines that the "Enter" key was pressed (step S106: YES), that is, when the user wishes to form the images as they are, the processing proceeds to step S109 and images corresponding to the thumbnail images are formed according to the layout of the thumbnail images displayed in the "2 in 1" views in the display section 82 (step S109).

On the other hand, when the CPU determines that the "Enter" key was not pressed (step S106: NO), that is, when the user further performs the operation of specifying positions (layout) for the N-up image view (or the separation view), the position receiving section 831 receives the position (layout) specifications on the basis of the detection result by the position detecting section 81 (step S107). Since the position (layout) specifications for the N-up image view (or the separation view) are received in the above-described manner, the detailed explanation will be omitted.

Thereafter, the N-up image display section 832 (or the separation display section 833) displays the N-up image view (or the separation view) on the basis of the position (layout) specifications received by the position receiving section 831 (step S108). Since the N-up image view by the N-up image display section 832 and the separation view by the separation display section 833 are implemented as described above, the detailed explanation will be omitted.

At this time, it may be possible to configure the variation display section 834 to display as text in the display section 82 the correlation between an increase or decrease in the number of thumbnail images to be displayed in the N-up image views or the separation views and an increase or decrease in the number of windows displayed in the N-up image views or the separation views.

Next, upon an instruction from the CPU, the image output unit 5 forms images corresponding to the thumbnail images according to the layout of the thumbnail images for the N-up image view or the separation view displayed in the display section 82 (step S109).

In the above-description, although the explanation is given by way of an example in which a determination as to whether or not the "Ecology" soft key was pressed (step S103) is made after displaying thumbnail images (step S102), the present invention is not limited to this. In the case where the determination is made before or after reading the document (step S101), if it is determined that the "Ecology" soft key was pressed, the "2 in 1" view may be displayed when displaying the thumbnail images (step S102).

In the above-description, the explanation is given by way of an example in which, when displaying a plurality of thumbnail images in a single new window for the N-up image view, the layout of thumbnail images other than a thumbnail image which was touched first is also determined based on the touched position in the window of the thumbnail image which was touched first. However, the present invention is not limited to this.

For example, a "4 in 1" view may be configured such that a thumbnail image in a window which is touched on the bottom left side by the user is placed on the bottom left in a new window, and a thumbnail image in a window touched on the top right side by the user is placed on the top right in the new window. In other words, based on the contact position in the window of each thumbnail image, a layout of thumbnail images in a new window is specified for each thumbnail image.

In the above-description, the explanation is given by way of an example in which both of the correlation between an increase or decrease in the number of thumbnail images to be displayed in the N-up image view and an increase or decrease in the number of windows displayed in the N-up image view and the correlation between an increase or decrease in the number of thumbnail images to be separately displayed and an increase or decrease in the number of windows displayed in the separation views are displayed in the display section 82. However, the present invention is not limited to this, and either one of the correlations may be displayed.

(Embodiment 2)

FIG. 16 is a functional block diagram illustrating an essential configuration of a digital multi-function printer 1 according to Embodiment 2 of the present invention. The digital multi-function printer 1 of Embodiment 2 is configured to be capable of providing a program for performing operations by a portable recording medium A, which is a recording medium such as a CD-ROM, through a communication I/F 11. Moreover, the digital multi-function printer 1 of Embodiment 2 is configured to also be capable of downloading the computer program from an external device (not shown) through the communication I/F 11. The contents will be explained below.

The digital multi-function printer 1 of Embodiment 2 comprises an external (or internal) recording medium reading device (not shown). By inserting into the recording medium reading device the portable recording medium A which stores a program for receiving position for thumbnail images for a reduced view on the basis of the contact position in the windows of the thumbnail images, displaying a N-up image view by reducing a plurality of thumbnail images and displaying them in a single window on the basis of the received position, receiving a layout for the thumbnail images to be displayed separately on the basis of the contact position in the window of the N-up image view, displaying the thumbnail images separately on the basis of the received layout, and displaying the correlation between an increase or decrease in the number of thumbnail images to be displayed in the N-up image views, or the separation views, and an increase or decrease in the number of windows displayed in the N-up image views, or the separation views, the program is installed, for example, in the storage section 9. The program is loaded in the RAM and executed. With this program, the digital multi-function printer 1 of Embodiment 2 of the present invention performs its functions.

As the recording medium, since processing is performed by a microcomputer, a memory (not shown), for example, a ROM itself may be a program medium, or, if a program reading device is provided as an external storage device (not shown), the recording medium may be a program medium which is readable by being inserted into the program reading device.

In either case, stored program codes are accessible and executable by the CPU, or the program codes are read and the read program codes are downloaded in a program storage area, not shown, of a microcomputer and executed. The program for downloading is stored in advance in the main body.

Here, the program medium is a recording medium removable from the main body, and may be a medium carrying program codes in a fixed manner, such as tapes including a magnetic tape or a cassette tape, disks including magnetic disks such as a flexible disk or a hard disk, or optical disks such as a CD-ROM, MO, MD, and DVD, cards such as an IC card (including a memory card) and an optical card, or semiconductor memory such as a mask ROM, an EPROM (Erasable Programmable Read Only Memory), an EEPROM (Electrically Erasable Programmable Read Only Memory), and a flash ROM.

The same parts as in Embodiment 1 are designated with the same reference numbers, and detailed explanations thereof will be omitted.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image display apparatus including at least a processor for reducing and displaying at least two thumbnail images in a single window as an N-up image view, comprising:

a display section configured to display a plurality of thumbnail images, a position detecting section configured to detect a contact position by sensing of a contact operation on a display screen of the display section, a position receiving section configured to receive a selection of the at least two thumbnail images, the position receiving section configured to receive an instruction of a position and an orientation facing direction for each of the at least two thumbnail images contacted in displaying the N-up image view, based on contact positions of the contact operation on the at least two of the thumbnail images and an order in which the at least two thumbnail images are touched by the contact operation; and an N-up image display section configured to display the N-up image view in which the at least two thumbnail images are reduced and placed in the window based on the instruction received by the position receiving section.

2. The image display apparatus according to claim 1, wherein the N-up image display section arranges a thumbnail image of the at least two thumbnail images contacted first at a specific position in the window.

3. The image display apparatus according to claim 2, wherein the window is rectangular and the specific position is a top side, a left side or a top left side in the window.

4. The image display apparatus according to claim 1, wherein a thumbnail image of the at least two thumbnail images contacted first, receives an instruction of an orientation facing direction of the thumbnail image to be displayed as the N-up image view.

* * * * *